United States Patent
Kachare et al.

(10) Patent No.: US 12,189,977 B2
(45) Date of Patent: Jan. 7, 2025

(54) SYSTEM AND METHOD FOR FINE GRANULAR RETENTION CONTROL IN STORAGE DEVICES

(71) Applicant: Samsung Electronics Co., Ltd., Suwon-si (KR)

(72) Inventors: Ramdas P. Kachare, Pleasanton, CA (US); Dongwan Zhao, San Jose, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 17/366,017

(22) Filed: Jul. 1, 2021

(65) Prior Publication Data
US 2022/0365707 A1   Nov. 17, 2022

Related U.S. Application Data

(60) Provisional application No. 63/187,919, filed on May 12, 2021.

(51) Int. Cl.
  *G06F 3/00* (2006.01)
  *G06F 3/06* (2006.01)
  *G06F 12/02* (2006.01)

(52) U.S. Cl.
  CPC .......... *G06F 3/0655* (2013.01); *G06F 3/0604* (2013.01); *G06F 3/0679* (2013.01);
  (Continued)

(58) Field of Classification Search
  CPC ......... G06F 12/0253; G06F 2212/7205; G06F 2212/7211; G06F 2212/702; G06F 3/0652; G06F 3/0655; G06F 3/0604
  See application file for complete search history.

(56) References Cited

U.S. PATENT DOCUMENTS

| | | | | |
|---|---|---|---|---|
| 8,331,128 B1* | 12/2012 | Derhacobian | ........ | G11C 29/816 |
| | | | | 365/189.08 |
| 9,912,752 B1* | 3/2018 | Davis | ................. | G06F 16/2365 |

(Continued)

FOREIGN PATENT DOCUMENTS

| KR | 20170142841 A | 12/2017 |
|---|---|---|
| KR | 20190035942 A | 4/2019 |

OTHER PUBLICATIONS

European Extended Search Report for Application No. 22168156.2, mailed Oct. 10, 2022.

*Primary Examiner* — Reginald G Bragdon
*Assistant Examiner* — Michael L Westbrook
(74) *Attorney, Agent, or Firm* — Renaissance IP Law Group LLP

(57) ABSTRACT

A storage device is disclosed. The storage device may include a host interface to receive a write request from a host, the write request may include a data and a logical address of the data. The storage device may further include a first storage for the data. The storage device may further include a retention period determiner to determine a retention period for the data. The storage device may further include a translation layer to select a physical address in the first storage to store the data based at least in part on the retention period. The storage device may further include a second storage for a logical-to-physical mapping table to map the logical address to the physical address and the retention period. Finally, the storage device may include a controller to program the data into the physical address in the first storage.

16 Claims, 23 Drawing Sheets

(52) U.S. Cl.
CPC .... *G06F 12/0253* (2013.01); *G06F 2212/702* (2013.01); *G06F 2212/7205* (2013.01); *G06F 2212/7211* (2013.01)

(56) References Cited

U.S. PATENT DOCUMENTS

| | | | |
|---|---|---|---|
| 9,940,039 | B2 | 4/2018 | Duzly et al. |
| 10,275,165 | B2 | 4/2019 | Inoue et al. |
| 10,871,909 | B2 | 12/2020 | Lam et al. |
| 10,949,113 | B2 | 3/2021 | Cai et al. |
| 11,204,705 | B2 * | 12/2021 | Sun ................ G06F 3/0649 |
| 2008/0065815 | A1 | 3/2008 | Nasu et al. |
| 2009/0327839 | A1 * | 12/2009 | Yoon ................ G11C 16/3454 714/E11.032 |
| 2012/0317377 | A1 | 12/2012 | Palay et al. |
| 2013/0275391 | A1 * | 10/2013 | Batwara ................ G06F 16/125 707/689 |
| 2014/0347914 | A1 * | 11/2014 | Sills ................ G11C 14/00 365/148 |
| 2016/0170871 | A1 | 6/2016 | Hyun et al. |
| 2016/0299715 | A1 * | 10/2016 | Hashimoto ........... G06F 3/0652 |
| 2017/0286221 | A1 * | 10/2017 | Azogui ................ G06F 3/0619 |
| 2018/0074730 | A1 | 3/2018 | Inoue et al. |
| 2019/0018604 | A1 | 1/2019 | Choi et al. |
| 2019/0212940 | A1 | 7/2019 | Cai et al. |
| 2021/0240612 | A1 * | 8/2021 | Muthiah ................ G06F 12/10 |
| 2021/0294692 | A1 * | 9/2021 | Chen ................ G06F 9/30189 |

\* cited by examiner

575

| Logical Address 610 | Physical Address 805 | Retention Period 615 | Number of Extensions 620 | ECC Mode 810 | Prog. Step Volt. 815 | Refresh Times 820 |
|---|---|---|---|---|---|---|
| | | | Logical-to-Physical Mapping Table | | | |
| 0000 | Die 0, Block 1, Address 0x0001_0000 | 1D | x3 | BCH | Large | x0 |
| 1005 | Die 0, Block 5, Address 0x0005_0330 | 1W | x1 | BCH | Medium | x0 |
| 2030 | Die 0, Block 10, Address 0x0010_0200 | 1M | x1 | LDPC | Small | x0 |
| 3112 | Die 0, Block 15, Address 0x0015_0011 | 1Y | x0 | LDPC | Small | x0 |
| 7880 | Die 0, Block 20, Address 0x0020_9000 | >1Y | x0 | LDPC | Small | x0 |
| ... | | | | | | |

| Table | | |
|---|---|---|
| Retention Period | ECC Mode | Prog. Step Volt. |
| 1D | BCH | Large |
| 1W | BCH | Medium |
| 1M | LDPC | Small |
| 1Y | LDPC | Small |
| >1Y | LDPC | Small |
| ⋮ | | |

615 → Retention Period
810 → ECC Mode
815 → Prog. Step Volt.

FIG. 9

SYSTEM AND METHOD FOR FINE GRANULAR RETENTION CONTROL IN STORAGE DEVICES

RELATED APPLICATION DATA

This application claims the benefit of U.S. Provisional Patent Application Ser. No. 63/187,919, filed May 12, 2021, which is incorporated by reference herein for all purposes.

FIELD

The disclosure relates generally to storage devices, and more particularly to supporting fine granular data retention in storage devices.

BACKGROUND

As Not-And (NAND) flash technology continues to scale down and more bits are stored in a cell, the storage density has been improved. But increasing the storage density of cells in NAND flash memory may also impact reliability, programming speed, and endurance of flash memory. In order to satisfy the retention capability required by industrial standard, a Solid State Drive (SSD) controller may spend time on complex flash translation layer (FTL) block management and data protection design. NAND flash may be required to retain data for 1 to 10 years according to industrial standards. Satisfying retention requirements may involve using flash channel bandwidth, power, and other resources.

A need remains to support hosts specifying how long data is to be retained in storage devices.

BRIEF DESCRIPTION OF THE DRAWINGS

The drawings described below are examples of how embodiments of the disclosure may be implemented, and are not intended to limit embodiments of the disclosure. Individual embodiments of the disclosure may include elements not shown in particular figures and/or may omit elements shown in particular figures. The drawings are intended to provide illustration and may not be to scale.

FIG. 8 shows details of the logical-to-physical mapping table of FIG. 5, according to embodiments of the disclosure.

FIG. 9 shows details of the table(s) of FIG. 5 storing information about how to program data depending on the retention period, according to embodiments of the disclosure.

SUMMARY

Figure 1:
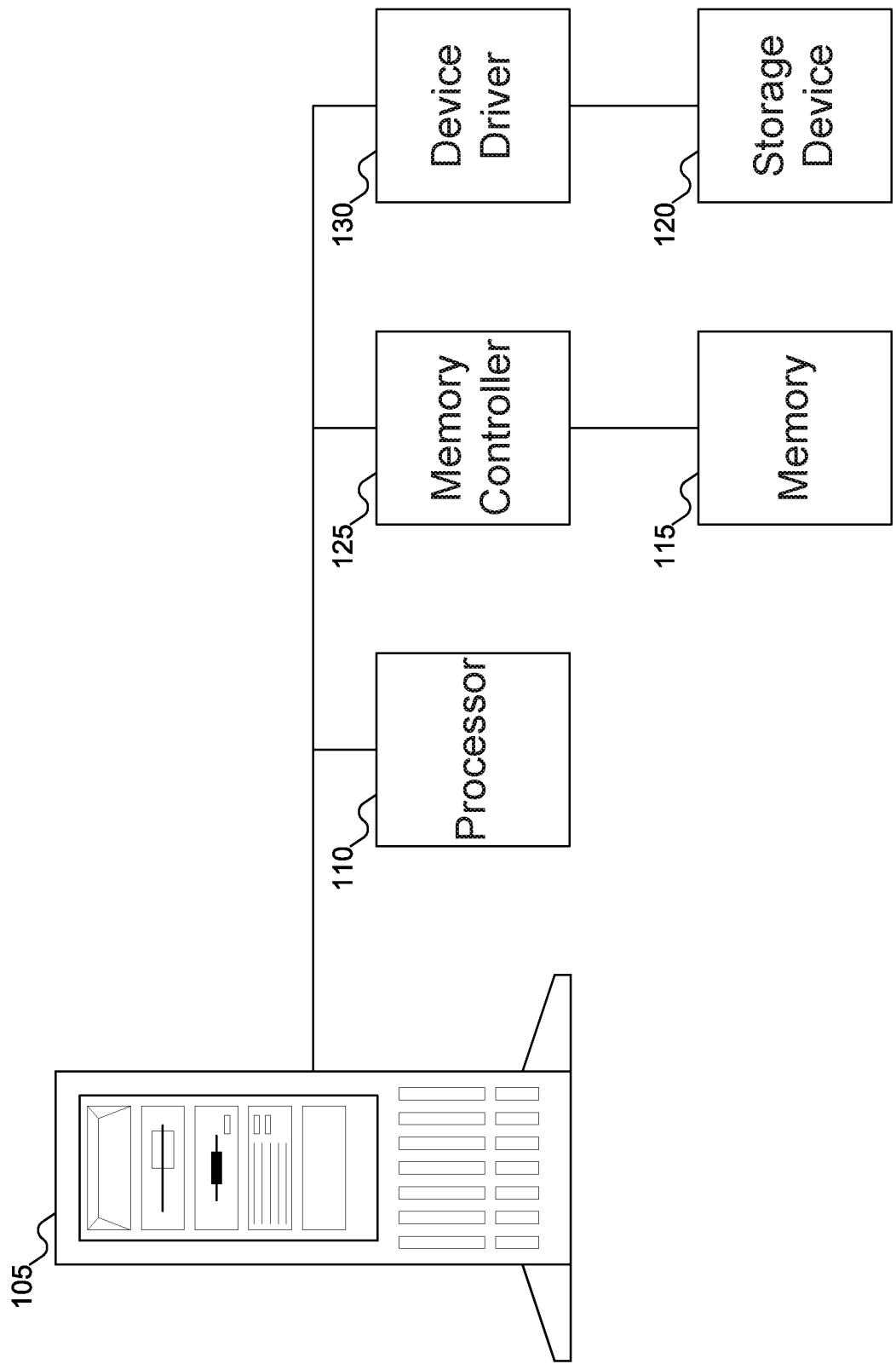
FIG. 1 shows a system including a storage device supporting data retention periods, according to embodiments of the disclosure.

Embodiments of the disclosure include a storage device that may support a data retention period. When the storage device receives a write request, the storage device may determine the retention period for the data. This information may be used to select where (and/or how) to program the data onto the storage device.

DETAILED DESCRIPTION

Reference will now be made in detail to embodiments of the disclosure, examples of which are illustrated in the accompanying drawings. In the following detailed description, numerous specific details are set forth to enable a thorough understanding of the disclosure. It should be understood, however, that persons having ordinary skill in the art may practice the disclosure without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the disclosure.

The terminology used in the description of the disclosure herein is for the purpose of describing particular embodiments only and is not intended to be limiting of the disclosure. As used in the description of the disclosure and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Many applications know the retention time (exact or approximate) for the data when writing to a storage device, which may be measured in hours or days (among other possibilities). For example, some application messages may be erased automatically after 24 hours, or junk email may be deleted after 1 month. Without receiving such information from the application, a storage device might perform unnecessary data movement, redundant garage collection operations, and longer data processing and programming time. These operations may impact the performance of the storage device.

Embodiments of the disclosure support an application specifying a data retention period for data to be written to the storage device. The storage device may then use this information to program the data: for example, programming the data with other data that is expected to be invalidated around the same time. The storage device may then automatically invalidate the data when the retention period expires, rather than managing storage to keep the data available to the application.

Embodiments of the disclosure may also include the application specifying a number of extensions. If a number of extensions is specified, the storage device may automatically renew the data retention period for the data until all extensions have been used, after which the data may be automatically invalidated. Renewing the data retention period may involve programming the data into another location in the storage device.

FIG. 1 shows a system including an accelerator to support dictionary decoding, according to embodiments of the disclosure. In FIG. 1, machine 105, which may also be termed a host, may include processor 110, memory 115, and storage device 120. Processor 110 may be any variety of processor. (Processor 110, along with the other components discussed below, are shown outside the machine for ease of illustration: embodiments of the disclosure may include these components within the machine.) While FIG. 1 shows a single processor 110, machine 105 may include any number of processors, each of which may be single core or multi-core processors, each of which may implement a Reduced Instruction Set Computer (RISC) architecture or a Complex Instruction Set Computer (CISC) architecture (among other possibilities), and may be mixed in any desired combination.

Processor 110 may be coupled to memory 115. Memory 115 may be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM) etc. Memory 115 may also be any desired combination of different memory types, and may be managed by memory controller 125. Memory 115 may be used to store data that may be termed "short-term": that is, data not expected to be stored for extended periods of time. Examples of short-term data may include temporary files, data being used locally by applications (which may have been copied from other storage locations), and the like.

Processor 110 and memory 115 may also support an operating system under which various applications may be running. These applications may issue requests (which may also be termed commands) to read data from or write data to either memory 115 or storage device 120. Storage device 120 may be accessed using device driver 130. While FIG. 1 uses the generic term "storage device", embodiments of the disclosure may include any storage device formats that may benefit from the use of data quality metrics, examples of which may include hard disk drives and Solid State Drives (SSDs). Any reference to "SSD" below should be understood to include such other embodiments of the disclosure. In addition, while FIG. 1 shows one storage device 120, embodiments of the disclosure may include any number (one or more) of storage devices.

Figure 2:
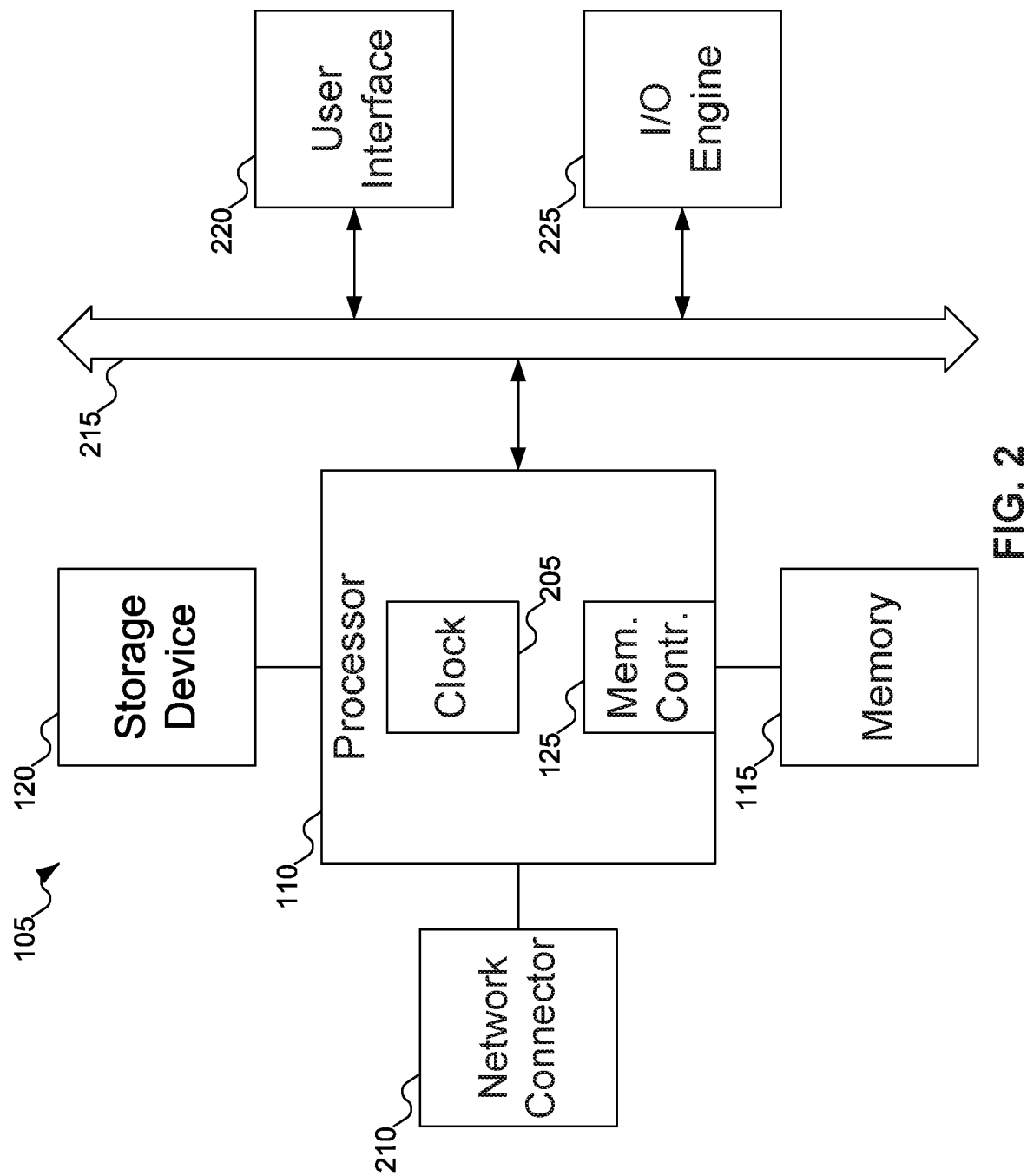
FIG. 2 shows details of the machine of FIG. 1, according to embodiments of the disclosure.

FIG. 2 shows details of machine 105 of FIG. 1, according to embodiments of the disclosure. In FIG. 2, typically, machine 105 includes one or more processors 110, which may include memory controllers 125 and clocks 205, which may be used to coordinate the operations of the components of the machine. Processors 110 may also be coupled to memories 115, which may include random access memory (RAM), read-only memory (ROM), or other state preserving media, as examples. Processors 110 may also be coupled to storage devices 120, and to network connector 210, which may be, for example, an Ethernet connector or a wireless connector. Processors 110 may also be connected to buses 215, to which may be attached user interfaces 220 and Input/Output (I/O) interface ports that may be managed using I/O engines 225, among other components.

Figure 3:
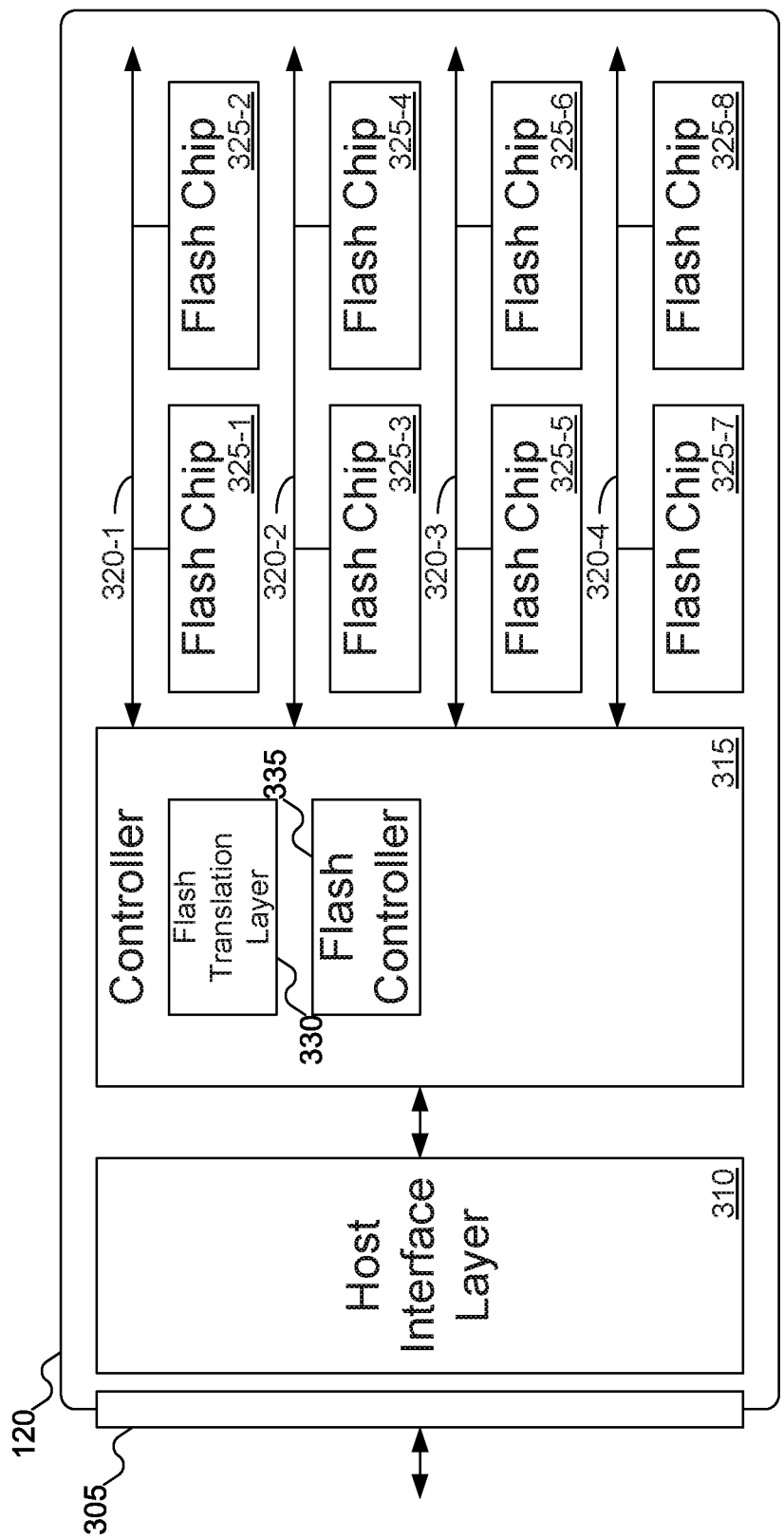
FIG. 3 shows a Solid State Drive (SSD) supporting data retention periods, according to embodiments of the disclosure.

FIG. 3 shows a Solid State Drive (SSD) supporting dictionary decoding, according to embodiments of the disclosure. In FIG. 3, SSD 120 may include interface 305. Interface 305 may be an interface used to connect SSD 120 to machine 105 of FIG. 1. SSD 120 may include more than one interface 305: for example, one interface might be used for block-based read and write requests, and another interface might be used for key-value read and write requests. While FIG. 3 suggests that interface 305 is a physical connection between SSD 120 and machine 105 of FIG. 1, interface 305 may also represent protocol differences that may be used across a common physical interface. For example, SSD 120 might be connected to machine 105 using a U.2 or an M.2 connector, but may support block-based requests and key-value requests: handling the different types of requests may be performed by a different interface 305.

SSD 120 may also include host interface layer 310, which may manage interface 305. If SSD 120 includes more than one interface 305, a single host interface layer 310 may manage all interfaces, SSD 120 may include a host interface layer for each interface, or some combination thereof may be used.

SSD 120 may also include SSD controller 315, various channels 320-1, 320-2, 320-3, and 320-4, along which various flash memory chips 325-1, 325-2, 325-3, 325-4, 325-5, 325-6, 325-7, and 325-8 may be arrayed. SSD controller 315 may manage sending read requests and write requests to flash memory chips 325-1 through 325-8 along channels 320-1 through 320-4. Although FIG. 3 shows four channels and eight flash memory chips, embodiments of the disclosure may include any number (one or more, without bound) of channels including any number (one or more, without bound) of flash memory chips.

Figure 4:
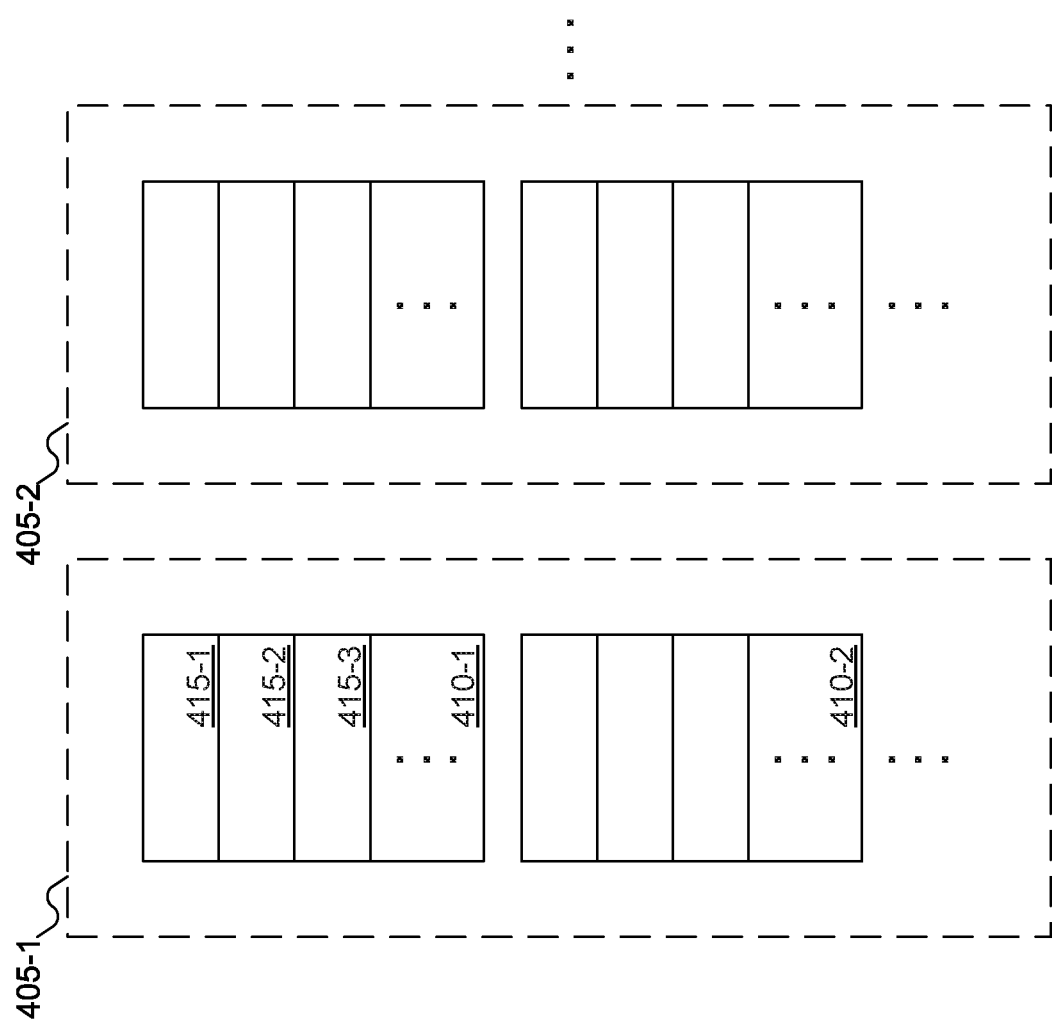
FIG. 4 shows the structure of the flash memory chips of FIG. 3, according to embodiments of the disclosure.

Within each flash memory chip, the space may be organized into blocks, which may be further subdivided into pages, and which may be grouped into superblocks. As shown in FIG. 4, a flash memory chip may include superblocks 405-1 and 405-2; superblock 405-1 may include blocks 410-1 and 410-2; and block 410-1 may include pages 415-1, 415-2, 415-3, and so on. The page is typically the smallest unit of data that may be read or written on an SSD. Page sizes may vary as desired: for example, a page may be 4 KB of data. If less than a full page is to be written, the excess space is "unused".

While FIG. 4 shows two superblocks 405-1 and 405-2, two blocks 410-1 and 410-2 in superblock 405-1, and three pages 415-1, 415-2, and 415-3 in block 410-1, embodiments of the disclosure may include any number of superblocks (one or more) without bound, each superblock including any number of blocks (one or more) without bound, and each block including any number of pages (one or more) without bound. Further, a flash memory chip might not organize data into superblocks, but only blocks and pages.

Returning to FIG. 3, while pages may be written and read, SSDs typically do not permit data to be overwritten: that is, existing data may be not be replaced "in place" with new data. Instead, when data is to be updated, the new data is written to a new page on the SSD, and the original page is invalidated (marked ready for erasure). Thus, SSD pages typically have one of three states: free (ready to be written), valid (containing valid data), and invalid (no longer containing valid data, but not usable until erased) (the exact names for these states may vary).

But while pages may be written and read individually, the block is the basic unit of data that may be erased. That is, pages are not erased individually: all the pages in a block are typically erased at the same time. For example, if a block contains 256 pages, then all 256 pages in a block are erased at the same time. This arrangement may lead to some management issues for the SSD: if a block is selected for erasure that still contains some valid data, that valid data may need to be copied to a free page elsewhere on the SSD before the block may be erased. (In some embodiments of the disclosure, the unit of erasure may differ from the block: for example, it may be a superblock, which as discussed above may be a set of multiple blocks.)

Because the units at which data is written and data is erased differ (page vs. block), if the SSD waited until a block contained only invalid data before erasing the block, the SSD might actually run out of available storage space, even though the amount of valid data might be less than the advertised capacity of the SSD. To avoid such a situation, SSD controller 315 may include a garbage collection controller (not shown in FIG. 3, but discussed further with reference to FIG. 5 below). The function of the garbage collection may be to identify blocks that contain all or mostly all invalid pages and free up those blocks so that valid data may be written into them again. But if the block selected for garbage collection includes valid data, that valid data will be erased by the garbage collection logic (since the unit of erasure is the block, not the page). To avoid such data being lost, the garbage collection logic may program the valid data from such blocks into other blocks. Once the data has been programmed into a new block (and the table mapping logical block addresses (LBAs) to physical block addresses (PBAs) updated to reflect the new location of the data), the block may then be erased, returning the state of the pages in the block to a free state.

SSDs also have a finite number of times each cell may be written before cells may not be trusted to retain the data correctly. This number is usually measured as a count of the number of program/erase cycles the cells undergo. Typically, the number of program/erase cycles that a cell may support mean that the SSD will remain reliably functional for a reasonable period of time: for personal users, the user may be more likely to replace the SSD due to insufficient storage capacity than because the number of program/erase cycles has been exceeded. But in enterprise environments, where data may be written and erased more frequently, the risk of cells exceeding their program/erase cycle count may be more significant.

To help offset this risk, SSD controller 315 may employ a wear leveling controller (not shown in FIG. 3). Wear leveling may involve selecting data blocks to program data based on the blocks' program/erase cycle counts. By selecting blocks with a lower program/erase cycle count to program new data, the SSD may be able to avoid increasing the program/erase cycle count for some blocks beyond their point of reliable operation. By keeping the wear level of each block as close as possible, the SSD may remain reliable for a longer period of time.

SSD controller 315 may include flash translation layer (FTL) 330 (which may be termed more generally a translation layer, for storage devices that do not use flash storage) and flash controller 335 (which may be termed more generally a controller, for storage devices that do not use flash storage). FTL 330 may handle translation of LBAs or other logical IDs (as used by processor 110 of FIG. 1) and physical block addresses (PBAs) or other physical addresses where data is stored in flash chips 325-1 through 325-8. FTL 330, may also be responsible for relocating data from one PBA to another, as may occur when performing garbage collection and/or wear leveling. FTL 330 is discussed further with reference to FIG. 5 below. Flash controller 335 may handle the actual communication with flash memory chips 325-1 through 325-8 along channels 320-1 through 320-4, using information provided by FTL 330. Flash controller 335 is discussed further with reference to FIG. 10 below.

Figure 5:
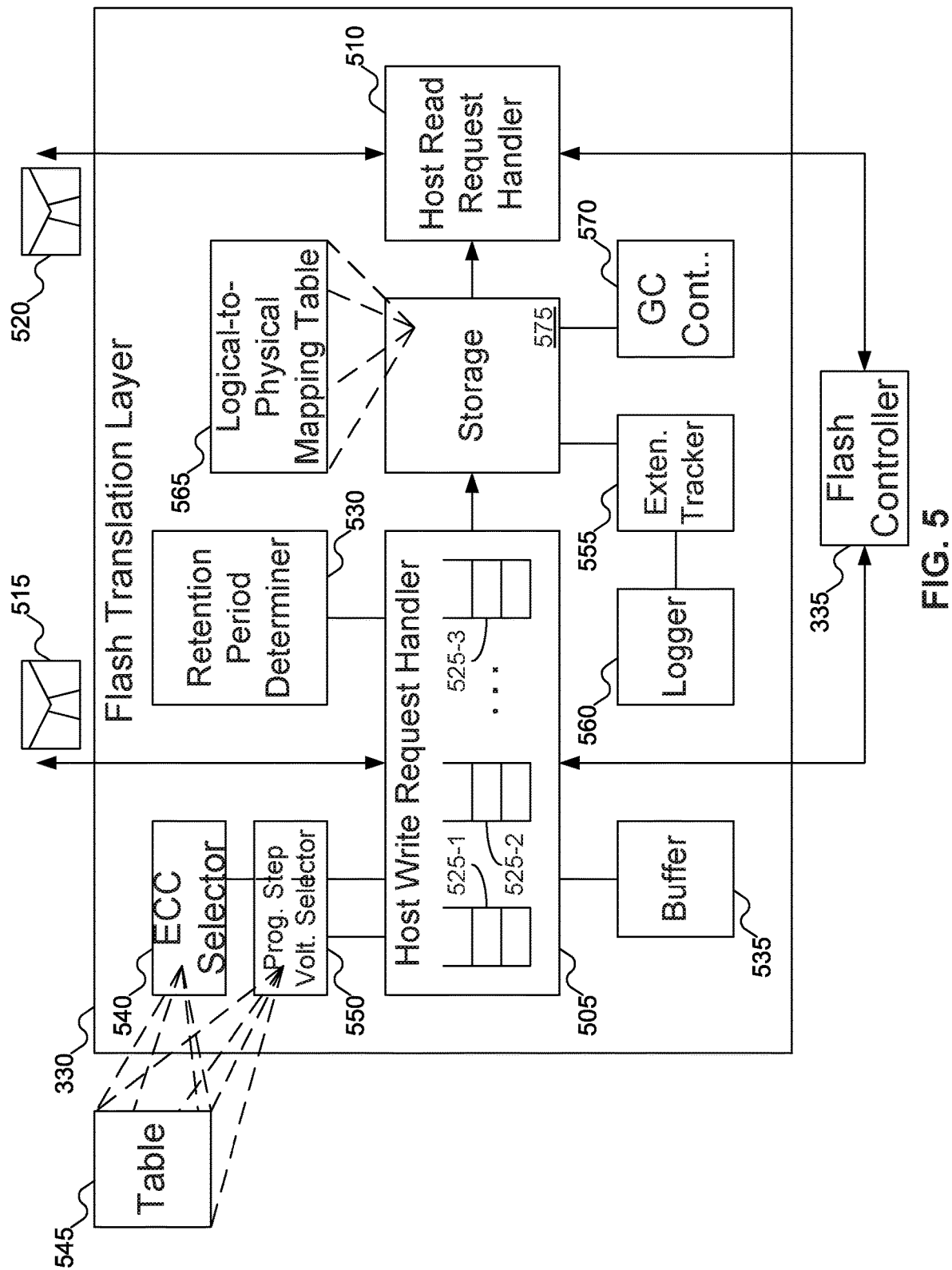
FIG. 5 shows details of the flash translation layer of FIG. 3, according to embodiments of the disclosure.

FIG. 5 shows details of FTL 330 of FIG. 3, according to embodiments of the disclosure. In FIG. 5, FTL 330 may include host write request handler 505 and host read request handler 510. As the descriptors imply, host write request handler 505 may handle write requests, such as write request 515, received from host 105 of FIG. 1 (or from other hosts, either local to or remote from host 105 of FIG. 1), and host read request handler 510 may handle read requests, such as read request 520, from host 105 of FIG. 1 (or from other hosts, either local to or remote from host 105 of FIG. 1).

Host write request handler 505 may include submission queues 525-1, 525-2, and 525-3. Each submission queue 525-1 through 525-3 may be used for write requests with different associated retention periods. So, for example, submission queue 525-1 may be used for write requests with a data retention period of 1 day, submission queue 525-2 may be used for write requests with a data retention period of 1 week, submission queue 525-3 may be used for write requests with a data retention period of 1 month, and so on. Other data retention periods may also be used: for example, one year, greater than one year, two weeks, etc. While FIG. 5 shows three submission queues 525-1 through 525-3, embodiments of the disclosure may support any number of submission queues, each of which may be associated with a different retention period. In addition, submission queues 525-1 through 525-3 may leverage technologies as well. For example, each submission queue 525-1 through 525-3 may be associated with a combination of a data retention period and a device stream ID, thus permitting stream IDs and data retention periods to be combined.

The retention period for a particular write request may be determined using retention period determiner 530. Retention period determiner may determine the retention period for a particular data in a number of different ways. In some embodiments of the disclosure, write request 515 may specify the data retention period to be applied for the data in that write request. For example, an application whose data is retained for no more than 24 hours may specify a retention period of 1 day as part of write request 515. In other embodiments of the disclosure, storage device 120 of FIG. 1 may include a default retention period, which may be applied to all data written to storage device 120 of FIG. 1 (unless another retention period is specified, such as by being included with write request 515). In still other embodiments of the disclosure, a property of write request 515 may be identified, which may in turn be used to determine the retention period for the data. Examples of such properties may include a range of LBAs, a command identifier, a namespace identifier, a stream identifier, a zone namespace identifier, an identifier of submission queue 525-1 through 525-3, a date, a time, a protocol, a media access control identifier, a network parameter, or a storage device parameter, among other possibilities. For example, an application may have a particular LBA range assigned to it. FTL 330 may map any LBA in that LBA range to a particular retention period. An application with a different LBA range may have a different retention period. Further, there is no requirement that an application may have only one LBA range associated with a retention period: a single application may have multiple LBA ranges, each with different retention periods associated with them. (But even if write request 515 includes an address in an LBA range with an associated retention period, such an assignment may be overridden by a particular retention period included with write request 515).

Retention period determiner 530 may be implemented in any desired manner. Retention period determiner 530 may be implemented using hardware, such as a central processing unit (CPU), a graphics processing unit (GPU), a general purpose GPU (GPGPU), a Field Programmable Gate Array (FPGA), or an Application-Specific Integrated Circuit (ASIC), among other possibilities. Retention period determiner 530 may also be implemented as software that may run on a processor or some equivalent hardware within storage device 120 of FIG. 1; when not in active use (for example, if storage device 120 of FIG. 1 is powered down), any software implementing part or all of retention period determiner 530 may be retained in storage somewhere: for example, in a dedicated storage within FTL 330, within flash memory chips 325-1 through 325-8 of FIG. 3, or as firmware within some form of ROM (including a Programmable ROM (PROM), an Erasable PROM (EPROM), and an Electrically Erasable PROM (EEPROM), among other possibilities).

In some embodiments of the disclosure, data may be written to flash memory chips 325-1 through 325-8 of FIG. 3 as soon as possible after a write request is placed in one of submission queues 525-1 through 525-3, with each write request having data stored in one (or more) pages in storage device 120 of FIG. 1. But in other embodiments of the disclosure, it may be desirable to write data in units of a block. By writing an entire block at one time, all the data written to the block may have the same retention period and may be processed at the same time. This approach may help minimize the impact of garbage collection: with all data in the block invalidated at one time, there would be no data that would require programming as part of garbage collection.

To store data until a block is full, FTL 330 may include buffer 535. Buffer 535 may temporarily store data for submission queues 525-1 through 525-3 until a given submission queue has enough data to fill a block. At that point, all the data that would fill the block for that submission queue may then be written to flash memory chips 325-1 through 325-8 of FIG. 3 and that data may be cleared from buffer 535. Note that this fact also means that a single block in storage device 120 may store data from two (or more) different write requests 515: in fact, that a single block may store data from two or more write requests 515 may be true whether or not buffer 535 is used to write a full block at a time.

In some embodiments of the disclosure, FTL 330 may include a single buffer 535. In such embodiments of the disclosure, buffer 535 may include sufficient storage equivalent to (or more than) one block per submission queue 525-1 through 525-3. In other embodiments of the disclosure, FTL 330 may include multiple buffers 535, one for each of submission queue 525-1 through 525-3. In still other embodiments of the disclosure, these options may be mixed: for example, submission queue 525-1 might have one buffer 535 for its data, while submission queues 525-2 and 525-3 might share another buffer 535.

FTL 330 may select a physical address for the data based on the retention period for the data, which is why using multiple submission queues 525-1 through 525-3 may be desirable. By using multiple submission queues, data with the same retention period may be programmed into the same block in flash memory chips 325-1 through 325-8 of FIG. 3, which may enable all data in the block to be invalidated at the same time. By invalidating all data in a block at the same time, it may be possible to avoid programming data from the block during garbage collection, which may help reduce the write amplification factor. But note that FTL 330 may select physical addresses for data to achieve this result without using multiple submission queues 525-1 through 525-3, if FTL 330 may track the retention periods of data in some other manner.

FTL 330 may also use wear leveling information to attempt to extend the life of storage device 120. As discussed above, wear leveling may attempt to place data into blocks to keep blocks from exceeding their maximum number of guaranteed program/erase cycles to rapidly. In addition to placing data in blocks with lower program/erase cycle counts, FTL 330 may also attempt to optimize data placement based on the data retention period. Whether data is placed in blocks with low or high program/erase cycle counts may involve balancing factors. Blocks that have higher program/erase cycle counts may be nearer to their "end of life", when failure may have a higher probability, which suggests that putting data with longer expected retention would be preferable. But blocks with higher program/erase cycle counts may also be more likely to suffer from errors that might occur if data is stored for longer periods of time.

One solution is to identify a threshold. For blocks whose program/erase cycle counts have not exceeded this threshold, data may be stored based on wear-leveling considerations: that is, blocks with relatively higher program/erase cycle counts (but less than the threshold) may be used to store data with longer expected data retention periods. But for blocks whose program/erase cycle counts have exceeded this threshold, data may be stored based on retention consideration: that is, blocks with relatively higher program/erase cycle counts (that exceed the threshold) may be used to store data with shorter expected data retention periods. In this manner, the various concerns of both wear leveling and accurate data retention may be considered.

The threshold may be a fixed number—for example, 50,000 program/erase cycles—or a percentage of the number of program/erase cycles the block is expected to support—for example, 50%. The threshold may also be variable, factoring in the number of program/erase cycles experienced by other blocks on the storage device. Thus, for example, if the blocks in the storage device are expected to experience 100,000 program/erase cycles before errors may be expected, if all the blocks are around 75,000 program/erase cycles, it might be expected that the blocks are all in roughly equal states, so the threshold might be set to 50% of the average remaining program/erase cycles in the storage device: in this example, $$75{,}000 + \tfrac{1}{2} \times (100{,}000 - 75{,}000) = 87{,}500.$$

Storage device 120 of FIG. 1 may be designed to meet certain standards for data retention. For example, storage device 120 of FIG. 1 may meet a standard that requires data to be retrievable one year, or five years, or 10 years after written. To meet these standards, storage device 120 of FIG. 1 may always encode data as thoroughly as supported, and may program data into flash memory chips 325-1 through 325-8 of FIG. 3 as carefully as possible. But for data that is not expected to be retained that long, it may be unnecessary for storage device 120 of FIG. 1 to take such measures to ensure data reliability. Storage device 120 of FIG. 1, through FTL 330 and flash controller 335, may be designed to leverage the retention period for data in selecting how to program data to reduce the amount of effort (power, time, and bandwidth) used if data is not expected to be retained to the maximum retention supported by storage device 120 of FIG. 1.

One way to leverage data retention periods is by selecting an error correction code (ECC) mode based on the expected retention period for the data. For example, storage device 120 of FIG. 1 may implement two or more different ECC modes. Two common ECC modes used in storage devices include Bose—Chaudhuri—Hocquenghem (BCH) and low-density parity check (LDPC), but other ECC modes may also be used. Different ECC modes may have different power requirements, involve different bandwidths (which means the amount of data sent across various busses internal to storage device 120) and different latencies (which means the time required to encode and/or decode the data using the ECC mode), and different supported levels of recovery. For example, LDPC often requires more power to implement than BCH, and may take longer to encode and decode the data than BCH. But LDPC may also permit recovery of more errors than BCH, and therefore may support longer reliability of the data. Thus, LDPC may be a more desirable choice for encoding data that is expected to be retained for longer periods of time.

ECC selector 540 may be used to select an ECC mode for data based on the retention period for the data. Thus, after retention period determiner 530 has determined the retention period for the data, ECC selector 540 may use that information to select an ECC mode for the data. Flash controller 335 may then encode the data using the selected ECC mode before programming the data in the designated location in flash memory chips 325-1 through 325-8 of FIG. 3.

ECC selector 540 may select the ECC mode in any desired manner. For example, ECC selector 540 may include table 545, which may map a particular retention period to a target ECC mode. ECC selector 540 may also use other techniques to select the ECC mode based on the retention period: for example, ECC selector 540 may implement a function that may (more generally) map a retention period to a particular value, which may indicate the ECC mode to use. Note too that in some embodiments of the disclosure, even though storage device 120 of FIG. 1 may support ECC, the data may be programmed without encoding: that is, ECC may be skipped even if available.

Another way to leverage a data retention period is to select a programming step voltage for the data. Flash memory chips 325-1 through 325-8 may support two or more different programming step voltages. In programming data into flash memory chips 325-1 through 325-8, flash controller 335 may increment the voltage in a cell by a step voltage (which may be represented as $\Delta V$) until the voltage in the cell meets or exceeds the target voltage (which may represent the value being stored in the cell). Smaller programming step voltages may enable more precise storage of the data, which may mean that the data may be reliably stored for a longer period of time. On the other hand, smaller programming step voltages may take longer to program a value into a cell. For example, if a larger $\Delta V$ is twice a smaller $\Delta V$, then it may be expected that using the smaller $\Delta V$ will require approximately twice as long to program the value into the cell. Thus, the selection of the programming step voltage may involve a tradeoff between precision (and reliability) and speed. For data that is expected to be retained for longer periods of time, a smaller programming step voltage may be desirable, whereas a larger programming step voltage may be used for data expected to be invalidated sooner.

Programming step voltage selector 550 may be used to select a programming step voltage for data based on the retention period for the data. Thus, after retention period determiner 530 has determined the retention period for the data, programming step voltage selector 550 may use that information to select a programming step voltage for the data. Flash controller 335 may then program the data into flash memory chips 325-1 through 325-8 of FIG. 3 using the selected programming step voltage.

Programming step voltage selector 550 may select the programming step voltage in any desired manner. For example, programming step voltage selector 550 may include table 545, which may map a particular retention period to a target programming step voltage. Programming step voltage selector 550 may also use other techniques to select the programming step voltage based on the retention period: for example, programming step voltage selector 550 may implement a function that may (more generally) map a retention period to a particular value, which may indicate the programming step voltage to use.

Note that FIG. 5 shows table 545 as used for both ECC selector 540 and programming step voltage selector 550. In some embodiments of the disclosure, ECC selector 540 and programming step voltage 550 may share table 545 (since both map the retention period to some value to be used in programming the data into flash memory chips 325-1 through 325-8 of FIG. 3). In other embodiments of the disclosure, ECC selector 540 and programming step voltage 550 may each have their own tables 545. In still other embodiments of the disclosure, ECC selector 540 and programming step voltage 550 may be implemented as one module (rather than separately as shown). In still other embodiments of the disclosure, table 545 may be stored elsewhere, rather than being part of ECC selector 540 and/or programming step voltage 550. Still other combinations are also possible and are considered embodiments of the disclosure. Table 545 and its variations are discussed further with reference to FIG. 9 below.

Like retention period determiner 530, ECC selector 540 and/or programming step voltage 550 may be implemented using hardware, such as a CPU, a GPU, a GPGPU, a FPGA, or an ASIC, among other possibilities. ECC selector 540 and/or programming step voltage 550 may also be implemented as software that may run on a processor or some equivalent hardware within storage device 120 of FIG. 1; when not in active use (for example, if storage device 120 of FIG. 1 is powered down), any software implementing part or all of retention period determiner 530 may be retained in storage somewhere: for example, in a dedicated storage within FTL 330, within flash memory chips 325-1 through 325-8 of FIG. 3, or as firmware within some form of ROM (including a PROM, an EPROM, and an EEPROM, among other possibilities). Since FTL 330 may operate to use retention periods without necessarily leveraging the choice of ECC or programming step voltage, ECC selector 540 and/or programming step voltage 550 may be omitted.

Once the physical address, ECC mode, and/or programming step voltage for the data have been determined, host write request handler 505 may provide this information (along with the data) to flash controller 335. Flash controller 335 may then program the data into flash memory chips 325-1 through 325-8 according to this information. Flash controller 335 may then return a result of the programming operation, which may be returned by host write request handler 505 to host 105 of FIG. 1. The operation of flash controller 335 is discussed further with reference to FIG. 10 below.

In some embodiments of the disclosure, once the retention period has expired the data may be automatically invalidated by storage device 120 of FIG. 1. But in other embodiments of the disclosure, data may also have an associated number of extensions. When the retention period expires, rather than automatically invalidating the data, the retention period may be renewed, up to the number of extensions associated with the data. Retention period determiner 530 may determine the number of extensions in a manner similar to how retention period determiner 530 determines the retention period. In this manner, an application may specify the desired retention period for data, but also ensure that the data is not invalidated immediately upon the retention period expiring (in case the application underestimated how long the data would be needed).

Renewing the retention period may involve just "resetting the clock" on the retention of the data. But in some embodiments of the disclosure, renewing the retention period may involve reprogramming the data into a newly selected block (selected by FTL 330 in the same manner as the original block selection). There may be at least two reasons why data may be reprogrammed when the retention period is renewed. First, just because one data in the block has its retention period renewed does not automatically mean that every data in the block will have its retention period renewed. If the data is left in place, if that block is subject to garbage collection the data may be programmed to a new block anyway. By reprogramming the data when the retention period is renewed, FTL 330 may be confident that the data is placed in a block with other data with the same retention period, while also ensuring that when the block is subject to garbage collection there may be no valid data remaining in the block (that might require programming). Second, as discussed above, depending on the ECC mode and programming step voltage used, the reliability of the data may be less than the maximum storage device 120 of FIG. 1 might be capable of supporting. Put another way, the data might have been programmed into flash memory chips 325-1 through 325-8 of FIG. 3 in a manner that ensures reliability for the data retention period, but not necessarily any longer. Leaving the data in place might result in the data not being readable when next requested by the application. Re-programming the data into a new block may help to ensure that the data continues to be readable for the duration of the (renewed) retention period.

Extension tracker 555 may handle these responsibilities. Extension tracker 555 may determine when a particular retention period is scheduled to expire (which, if data is written to flash memory chips 325-1 through 325-8 of FIG. 3 a block at a time, would mean that all the data in the block is scheduled to expire). Extension tracker 555 may determine the expiration time for data in advance (since the retention period should be known before the data is programmed into flash memory chips 325-1 through 325-8 of FIG. 3) and may schedule when to check that data for invalidation or reprogramming (depending on whether or not there are any remaining extension times). If a retention period is renewed, extension tracker 555 may update information about how many times the retention period may be further renewed (or, alternatively, may track how many extensions remain to renew the retention period). For data whose retention period is to be renewed, extension tracker 555 (possibly in combination with host write request handler 505) may treat the data like a new write request from the host; or extension tracker 555 may simply adjust the number of extension times remaining or the number of extensions used, select an appropriate new block for the data, and instruct flash controller 335 to reprogram the data (or alternatively, to copy the data from its original physical address to its new physical address, which might avoid decoding and reencoding of the data).

As noted above, in some situations—specifically where the retention period has expired and there are no extensions specified or remaining—extension tracker 555 may instruct flash controller 335 to invalidate the data. Because such data invalidation may occur without the application requesting invalidation, the application may not be aware that the data has been invalidated. (This concept may be contrasted with the abstract knowledge that the data will be automatically invalidated by storage device 120 of FIG. 1: the application may know that the data will be invalidated at some point, but might not know when that invalidation has occurred.) Extension tracker 555 may use logger 560 to record that data has been invalidated. Logger 560 may record the invalidation of the data (which may be recorded using the logical address of the data as specified by the application) in a data retention period log.

Once the data has been invalidated, extension tracker may update logical-to-physical mapping table 565 to reflect that the data is no longer valid. Logical-to-physical mapping table 565 is discussed further with reference to FIG. 8 below.

Thus, if the application tries to read the data and is notified that the data was not found (an error condition), host 105 of FIG. 1 may request the data retention period log. A review of the data retention period log may show that the data was invalidated due to expiration of the retention period (and any possible extensions). In this manner, host 105 of FIG. 1 may distinguish between read errors that result from automatic data invalidation and read errors due to a problem that may relate to the underlying hardware (for example, a cell that does not store or return the original value).

A question may arise regarding the use of both retention periods and extensions. Is not a retention period of one week with three extensions chronologically equivalent to a retention period of four weeks? The answer is that in terms of the overall possible retention of the data is the same either way, but there may be differences in how the data is programmed and how garbage collection may be impacted.

First, consider that data that has an associated retention period of one week might be programmed using a lower power-consuming ECC mode, and/or a larger programming step voltage, than data with an associated retention period of four weeks. In other words, by specifying a shorter data retention period, even with extensions, the power consumed and the time spent in programming the data with a retention of period of one week may be less than the power consumed or time spent in programming the data with a retention period of four weeks. True, this may be offset by the need to reprogram the data if the retention period is extended. But if the retention period is an accurate measure of how long the application actually wants the data to be stored on storage device 120, then the logical conclusion is that the data is more likely to be invalidated around one week than around four weeks. Put another way, the use of extension periods acts as a belt-and-suspenders approach, protecting against the (hopefully occasional) need for the data to be retained longer than expected. If the data was programmed into a block with a four-week retention period and then invalidated after only one week, the block might be more likely to have data needing to be programmed if the block is selected for garbage collection.

Figure 6:
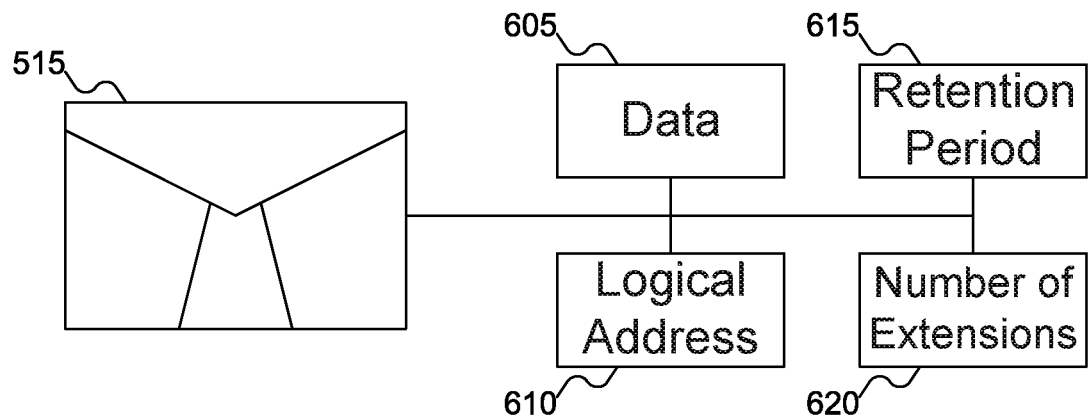
FIG. 6 shows information that may be included in a write request sent to the storage device of FIG. 1, according to embodiments of the disclosure.

Turning temporarily to FIG. 6, information included in write request 515 may be seen. Write request 515 may include data 605, which may be the data to be written to storage device 120 of FIG. 1. Write request 515 may also include logical address 610, which may be the logical address used by host 105 of FIG. 1 to identify the data. (Logical address 610 may be distinguished from the physical address where the data is actually stored in storage device 120 of FIG. 1.)

As discussed above, one way in which the retention period (and/or the number of extensions) for data 605 may be determined is by including such information in write request 515. That is, write request 515 may include fields that may specify retention period 615 and/or number of extensions 620. But if data retention periods are determined in other ways, then write request 515 may omit retention period 615 and/or number of extensions 620.

Returning to FIG. 5, like extension tracker 555, garbage collection controller 570 may also be scheduled, much like extension tracker 555. If blocks may be expected to be invalidated at a particular time (and recalling that even if data is to be retained due to an extension period, that data would be re-programmed to ensure the data reliability), then the block may be expected to be empty of valid data when the retention period expires. Thus, garbage collection controller 570 may use this idea to schedule when garbage collection may occur, aiming for times when blocks will be empty of valid data.

It may happen that the garbage collection logic might select a block for garbage collection used to store data with an assigned retention period. For example, for a particular block with a retention period of one month, most of the data might be manually invalidated by the applications that wrote that data to storage device 120 of FIG. 1, leaving a block that would be a good candidate for garbage collection. In that case, the garbage collection logic may attempt to determine the retention period of the data (which may be retrieved from logical-to-physical mapping table 565, discussed further with reference to FIG. 8 below) and may attempt to program the data into a block with a similar retention period. In that manner, hopefully data fragmentation (based on retention periods) may be avoided.

As discussed above, host 105 of FIG. 1 may refer to data 605 of FIG. 6 with logical address 610 of FIG. 6. But logical address 610 of FIG. 6 may not necessarily be related to the physical address where the data is actually stored on storage device 120. In fact, logical address 610 of FIG. 6 might not even be a legitimate address on storage device 120 of FIG. 1 (for example, logical address 610 of FIG. 6, if treated like a physical address, might be an address in the boot portion of storage device 120, which would normally not be addressable by an application). Further, if data 605 of FIG. 6 ends up being reprogrammed (due to renewal of the retention period or garbage collection), the physical address may change. Thus, FTL 330 may include logical-to-physical mapping table 565. Logical-to-physical mapping table 565 may store information about where data 605 of FIG. 6: logical address 610 of FIG. 6 as used by host 105 of FIG. 1, the physical address where the data is stored in storage device 120 of FIG. 1, and other pertinent information about data 605 of FIG. 6: for example, retention period 615 of FIG. 6. When FTL 330 of FIG. 3 receives write request 515 from host 105 of FIG. 1 and programs data 605 of FIG. 6 into flash memory chips 325-1 through 325-8 of FIG. 3, FTL 330 may update logical-to-physical mapping table 565 to store this information. Logical-to-physical mapping table 565 is discussed further with reference to FIG. 8 below.

Logical-to-physical mapping table 565 may be stored somewhere in storage device 120 of FIG. 1. In some embodiments, logical-to-physical mapping table 565 of FIG. 5 may be stored in storage 575. Storage 575 may be a non-volatile storage, such as another flash memory or NVRAM, protecting against any loss of information should storage device 120 of FIG. 1 be shut down (normally or abnormally). Alternatively, storage 575 may be a volatile storage: to protect against data loss, logical-to-physical mapping table 565 may be mirrored to flash memory chips 325-1 through 325-8 of FIG. 3. Finally, storage 575 may be an area on flash memory chips 325-1 through 325-8 of FIG. 3, rather than a separate storage.

Note that storage 575 may be used to store more than just logical-to-physical mapping table 565. For example, storage 575 may also store table 545 that maps a retention period to target ECC modes and/or programming step voltages.

Figure 7:
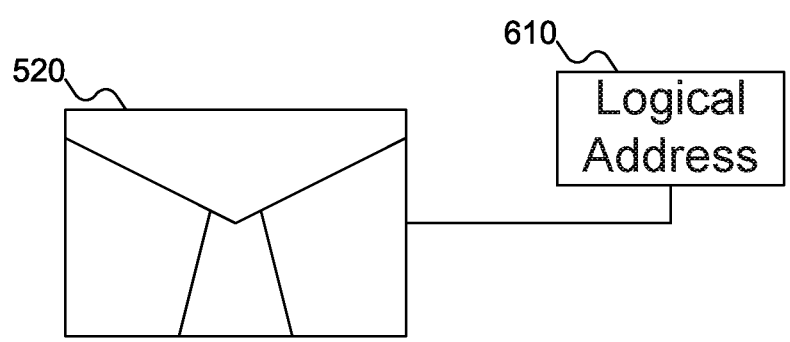
FIG. 7 shows information that may be included in a write request sent to the storage device of FIG. 1, according to embodiments of the disclosure.

Earlier, the handling of read requests was touched upon, in that read request 520 may result in an error if the data has been invalidated. The operation of host read request handler 510 may now be discussed. As shown in FIG. 7, read request 520 may include logical address 610. Since read request 520 is a request for storage device 120 of FIG. 1 to return data to the application, the other elements shown in FIG. 6 may be omitted from read request 520. (This is not to say that a read request consists solely of logical address 610; but read request 520 may omit data 605 of FIG. 6, retention period 615 of FIG. 6, and/or number of extensions 620 of FIG. 6.)

Returning to FIG. 5, host read request handler 510 may receive read request 520 from host 105 of FIG. 1. Using logical address 610, host read request handler 510 may determine the physical address where the data is stored from logical-to-physical mapping table 565. Host read request handler 510 may also determine the ECC mode used to encode the data from logical-to-physical mapping table 565. Host read request handler 510 may then provide this information to flash controller 335, which may then read the data from flash memory chips 325-1 through 325-8 of FIG. 3, decode the data (as appropriate), and return the data back to host read request handler 510, which may then return the data to host 105 of FIG. 1.

As discussed above, in some situations read request 520 may request data that has already been invalidated. In that case, host read request handler 510 may return an error directly (if logical-to-physical mapping table 565 does not have an entry for logical address 610 of FIG. 7). Alternatively, host read request handler 510 may send flash controller 335 a request to read the data from the physical address; flash controller 335 may determine that the data has been invalidated and may return an error to host read request handler 510, which may be forwarded to host 105 of FIG. 1. As discussed above, in cases where read request 520 results in an error, host 105 of FIG. 1 may request the data retention period log, to see if the data was invalidated automatically.

FIG. 8 shows details of logical-to-physical mapping table 565 of FIG. 5, according to embodiments of the disclosure. In FIG. 8, logical-to-physical mapping table 565 is shown as including seven columns and five rows (not counting the row with the column names). Embodiments of the disclosure may have logical-to-physical mapping table 565 including any number (zero or more) of rows, depending on the amount of data stores in storage device 120 of FIG. 1. Embodiments of the disclosure may also vary the number of columns in logical-to-physical mapping table 565: different embodiments may include less information than what is shown in FIG. 8, and/or additional information not shown in FIG. 8.

Each row in logical-to-physical mapping table 565 may include various fields, such as logical address 610, physical address 805, retention period 615, number of extensions 620, ECC mode 810, programming step voltage 815, and refresh times 820. Logical address 610 may be the logical address for the data as used by host 105 of FIG. 1. Physical address 805 may be the physical address where the data is stored in storage device 120 of FIG. 1. Retention period 615 may be the retention period for the data associated with logical address 610, and may be determined by retention period determiner 530 of FIG. 5. Number of extensions 620 may be the number of extensions for the retention period for the data associated with logical address 610, and may be determined by retention period determiner 530 of FIG. 5. ECC mode 810 may identify the ECC mode selected by ECC selector 540 of FIG. 5 for the data associated with logical address 610. Programming step voltage 815 may identify the programming step voltage selected by programming step voltage 550 of FIG. 5 for the data associated with logical address 610. Finally, refresh times 820 may identify the number of time the data has been refreshed (and which may be compared with number of extensions 620, which may represent the upper bound for refresh times 820).

Note that some of the data in logical-to-physical mapping table 565 may be determined from write request 515 of FIG. 5, and some may be filled in by FTL 330 of FIG. 3. For example, logical address 610, retention period 615, and number of extensions 620 may be accessed from write request 515 of FIG. 5, whereas physical address 805, ECC mode 810, programming step voltage 815, and refresh times 820 may be filled in by FTL 330 of FIG. 3. (Of course, depending on how storage device 120 of FIG. 1 is used, retention period 615 and/or number of extensions 620 may also be filled in by FTL 330 of FIG. 3.) The information in logical-to-physical mapping table 565 provides a picture of how data is stored in storage device 120 of FIG. 1, which supports both retrieval of the data when requested by host 105 of FIG. 1 in read request 520 of FIG. 5, and re-programming of the data when indicated by extension tracker 555 of FIG. 5.

FIG. 9 shows details of table 545 of FIG. 5 storing information about how to program data depending on the retention period, according to embodiments of the disclosure. In FIG. 9, one table 545 is shown, mapping retention periods to both ECC modes and programming step voltages. As discussed above, embodiments of the disclosure may include separate tables for mapping retention periods to ECC modes and to programming step voltages. In addition, if other variations in how data is programmed into flash memory chips 325-1 through 325-8 of FIG. 3, table 545 may be augmented to include such additional information, or to exclude information that is not used by storage device 120 of FIG. 1. Embodiments of the disclosure may have table 545 including any number (zero or more) of rows, depending on the number of different retention periods supported by storage device 120 of FIG. 1.

Each row in table 545 may include various fields, such as retention period 615, ECC mode 810, and programming step voltage 815. Retention period 615 may identify a retention period supported by storage device 120 of FIG. 1. ECC mode 810 may identify an ECC mode to be used when programming data with retention period 615. Programming step voltage 815 may identify a programming step voltage to be used when programming data with retention period 615. Thus, after retention period determiner 530 of FIG. 5 determines the retention period to be used for data 605 of FIG. 6 in write request 515 of FIG. 5, table 545 may be accessed by ECC selector 540 of FIG. 5 and/or programming step voltage selector 550 of FIG. 5 to determine the appropriate ECC mode and/or programming step voltage to use in programming data 605 of FIG. 6 into flash memory chips 325-1 through 325-8 of FIG. 3.

Figure 10:
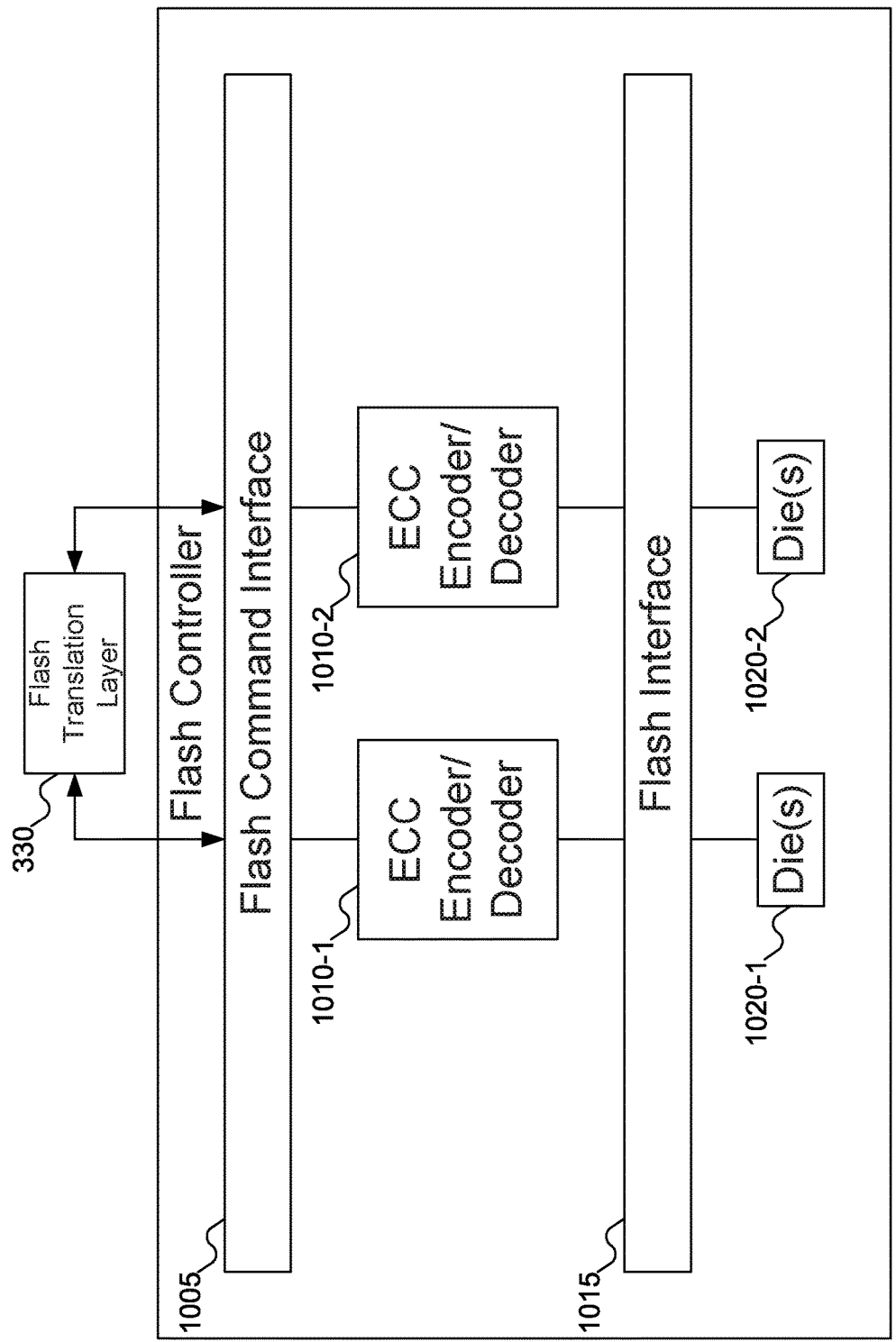
FIG. 10 shows details of the flash controller of FIG. 3, according to embodiments of the disclosure.

FIG. 10 shows details of flash controller 335 of FIG. 3, according to embodiments of the disclosure. In FIG. 10, flash controller 335 may receive requests from FTL 330. (Two paths are shown from FTL 330 to flash controller 335, to mirror the two paths—one for writing data and one for reading data—from FTL 330 to flash controller 335 as shown in FIG. 5.) Flash command interface 1005 may receive these requests. Since writing data and reading data involve different processes, they are discussed separately.

As discussed with reference to FIG. 5 above, when data is being written to storage device 120 of FIG. 1, the programming request received by flash controller 335 may include the data and the physical address where the data is to be written. In some embodiments of the disclosure these requests may also include an ECC mode to use in encoding the data and/or a programming step voltage to use in programming the data.

Flash command interface 1005 may identify the ECC mode to be used from the programming request, and may then use ECC encoders/decoders 1010-1 or 1010-2 to encode the data (producing an encoded data). While FIG. 10 shows two ECC encoders/decoders 1010-1 and 1010-2, embodiments of the disclosure may include any number (zero or more) ECC encoders/decoders.

Once the data has been encoded, the encoded data (or the original data, if the data is not to be encoded), the physical address where the data is to be programmed, and the programming step voltage (if used) may be delivered to flash interface 1015. Flash interface 1015 may be responsible for interfacing with dies 1020-1 and/or 1020-2 to program the data as directed. While FIG. 10 shows two dies 1020-1 and 1020-2, embodiments of the disclosure may include any number (one or more) of dies where data may be programmed.

Once flash interface 1015 has finished programming the data into dies 1020-1 and/or 1020-2, flash interface may return a result of the programming operation to flash command interface 1005, which may return the result back to FTL 330.

On the other hand, as discussed with reference to FIG. 5 above, when data is to be read from storage device 120 of FIG. 1, the programming request received by flash controller 335 may include the physical address from which the data is to be read. In some embodiments of the disclosure these requests may also include an ECC mode to use in decoding the data. Flash command interface 1005 may pass the physical address to flash interface 1015 to read the data from dies 1020-1 and/or 1020-2. This data (which may be encoded) may be returned by flash interface 1015.

Flash command interface 1005 may identify the ECC mode to be used from the read request, and may then use ECC encoders/decoders 1010-1 or 1010-2 to decode the encoded data (producing the original data). While FIG. 10 shows two ECC encoders/decoders 1010-1 and 1010-2, embodiments of the disclosure may include any number (zero or more) ECC encoders/decoders. Flash command interface 1005 may then return the unencoded data back to FTL 330, which may return the data back to host 105 of FIG. 1.

If, for some reason the data has been invalidated before the read request was processed, flash interface 1015 may return an error (because the data might not be available). In that case, flash command interface 1005 may return the error to FTL 330, which may in turn return the error to host 105 of FIG. 1.

Figure 11:
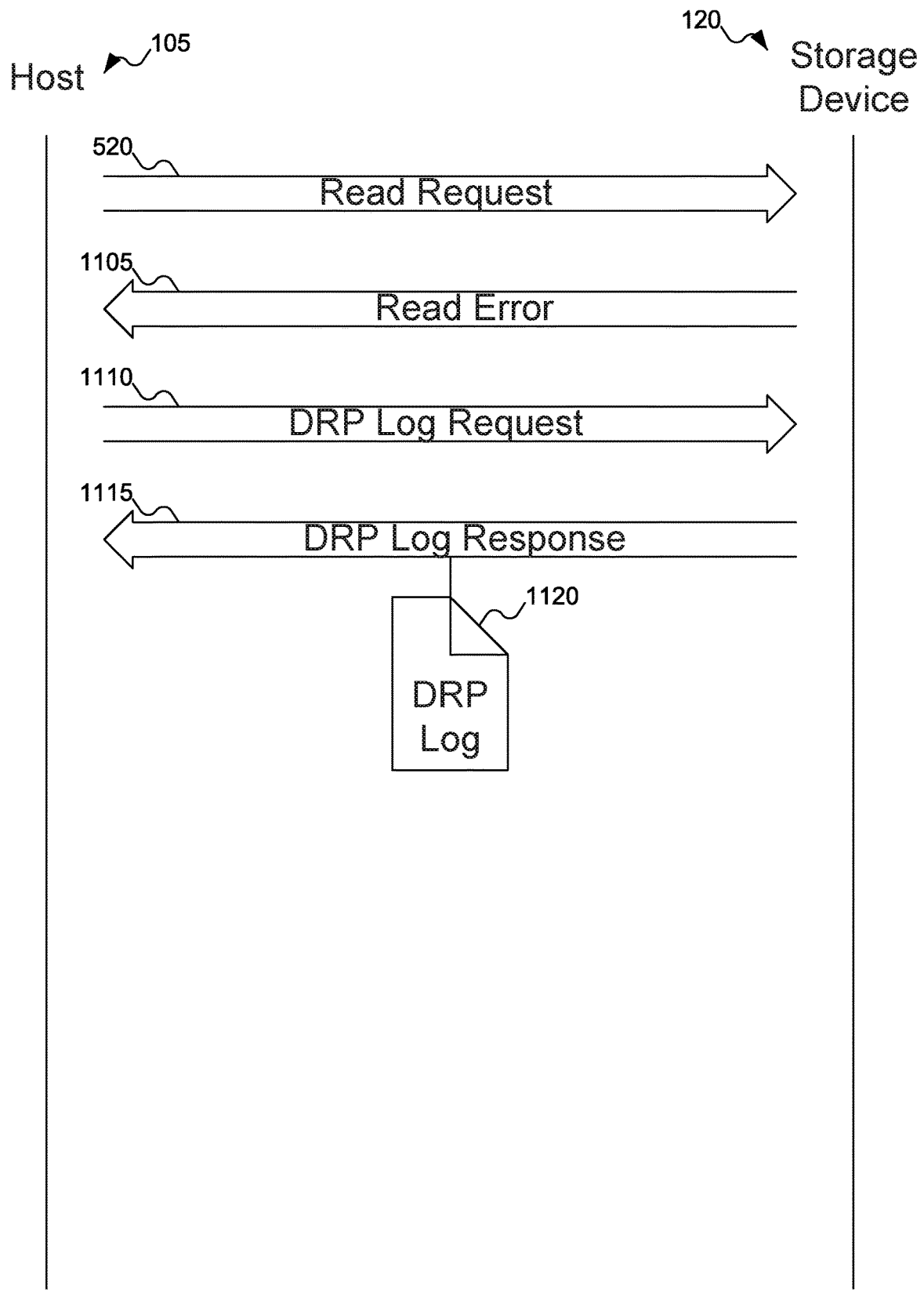
FIG. 11 shows the machine of FIG. 1 and the storage device of FIG. 1 exchanging information about the data retention period log generated by the logger of FIG. 5, according to embodiments of the disclosure.

FIG. 11 shows machine 105 of FIG. 1 and storage device 120 of FIG. 1 exchanging information about the data retention period log generated by logger 560 of FIG. 5, according to embodiments of the disclosure. In FIG. 11, host 105 may send read request 520 to storage device 120. If the data has already been invalidated (which, as discussed with reference to FIG. 5 above, may happen even without the application issuing a request to invalidate the data), then read request 520 may result in error 1105, which may be returned to host 105. Host 105 may then send data retention period log request 1110 to storage device 120: storage device 120 may then respond with data retention period log response 1115, which may include data retention period log 1120. Host 105 may then use data retention period log 1120 to determine that the data was automatically invalidated because the retention period expired (as opposed to some other error that may indicate a problem with storage device 120).

Figure 12:
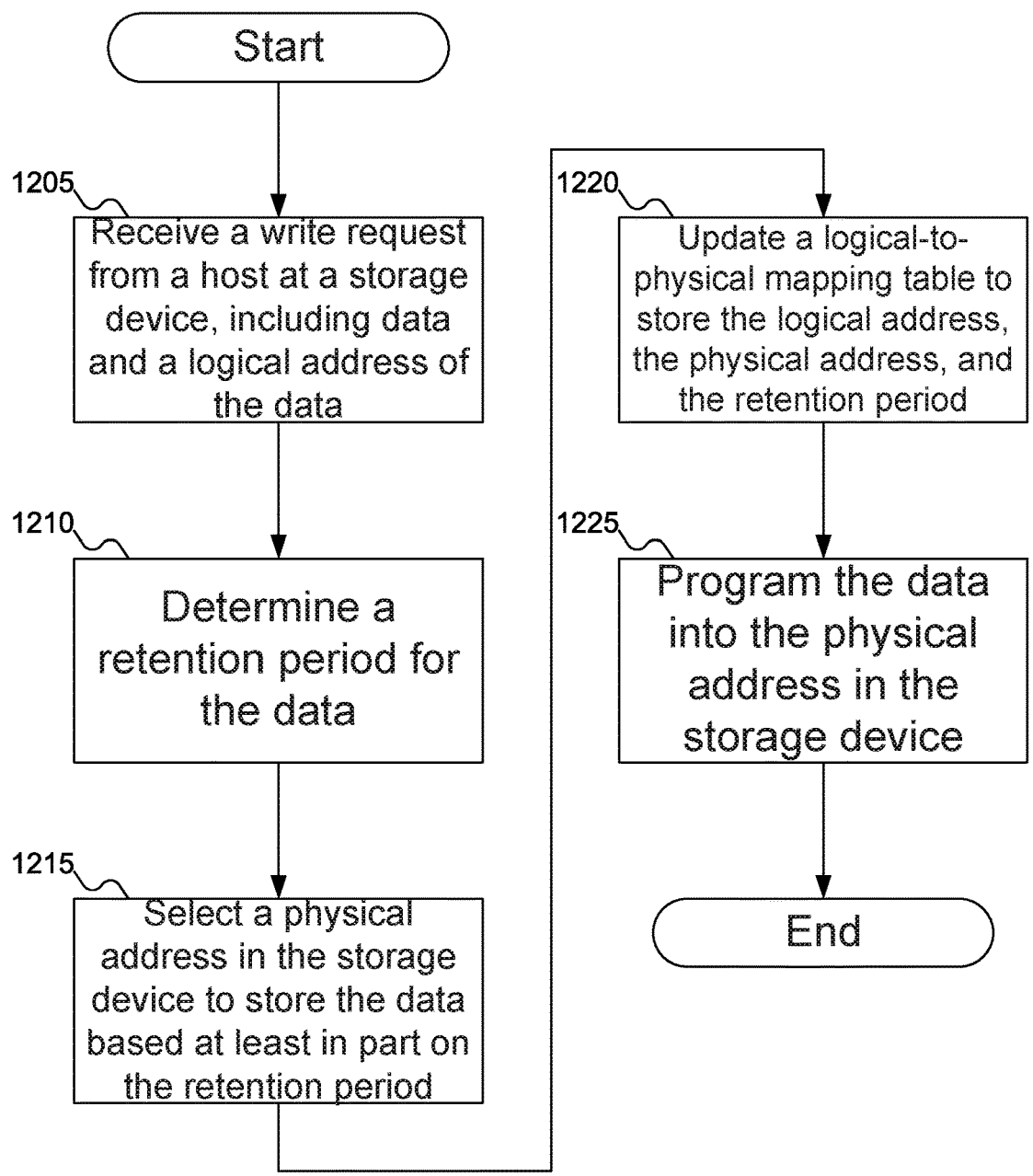
FIG. 12 shows a flowchart of an example procedure for the storage device of FIG. 1 to process a write request for data with a retention period, according to embodiments of the disclosure.

FIG. 12 shows a flowchart of an example procedure for storage device 120 of FIG. 1 to process write request 515 of FIG. 5 for data 605 of FIG. 6 with retention period 615 of FIG. 6, according to embodiments of the disclosure. In FIG. 12, at block 1205, storage device 120 of FIG. 1 may receive write request 515 of FIG. 5 from host 105 of FIG. 1. Write request 515 of FIG. 5 may include data 605 of FIG. 6 and logical address 610 of FIG. 6, as specified by host 105 of FIG. 1. At block 1210, retention period determiner 530 of FIG. 5 may determine retention period 615 of FIG. 6 associated with write request 515 of FIG. 5. As discussed above with reference to FIG. 5, retention period 615 of FIG. 6 may be included with write request 515 of FIG. 5, retention period 615 of FIG. 6 may be determined based on some property of write request 515 of FIG. 5, or retention period 615 of FIG. 6 may be a default retention period for storage device 120 of FIG. 1.

At block 1215, FTL 330 of FIG. 3 may select physical address 805 of FIG. 8 where data 605 of FIG. 6 is to be programmed in storage device 120 of FIG. 1. The selection of physical address 805 of FIG. 8 by FTL 330 of FIG. 3 may be based at least in part on retention period 615 of FIG. 6. At block 1220, FTL 330 of FIG. 3 (or host write request handler 505 of FIG. 5) may update logical-to-physical mapping table 565 of FIG. 5 to store logical address 610 of FIG. 6, physical address 805 of FIG. 8, and retention period 615 of FIG. 6. Finally, at block 1225, flash controller 335 of FIG. 3 may program data 605 of FIG. 6 into physical address 805 of FIG. 8 in storage device 120 of FIG. 1.

Figure 13A:
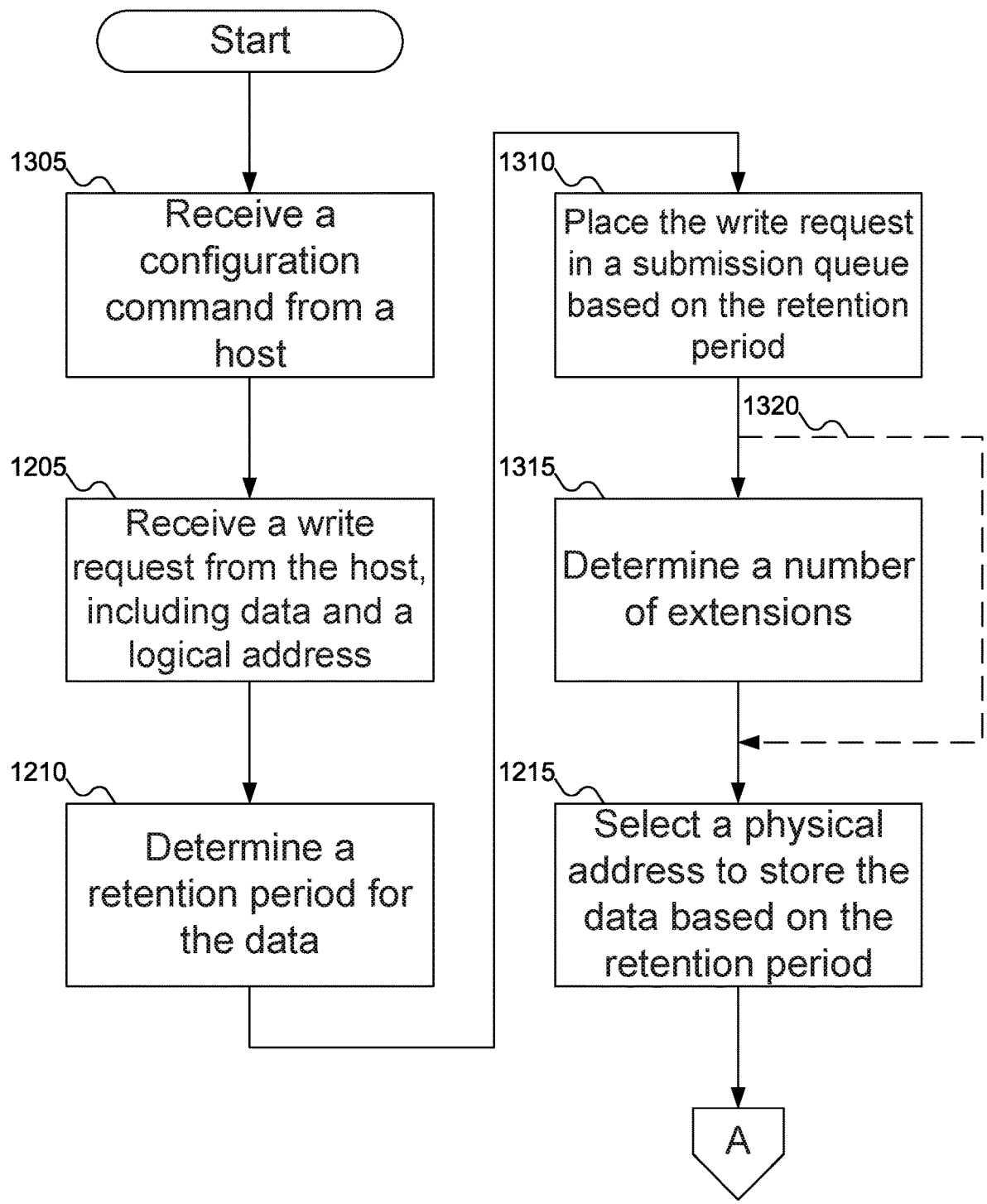
FIG. 13A shows a flowchart of another example procedure for the storage device of FIG. 1 to process a write request for data with a retention period, according to embodiments of the disclosure.
Figure 13B:
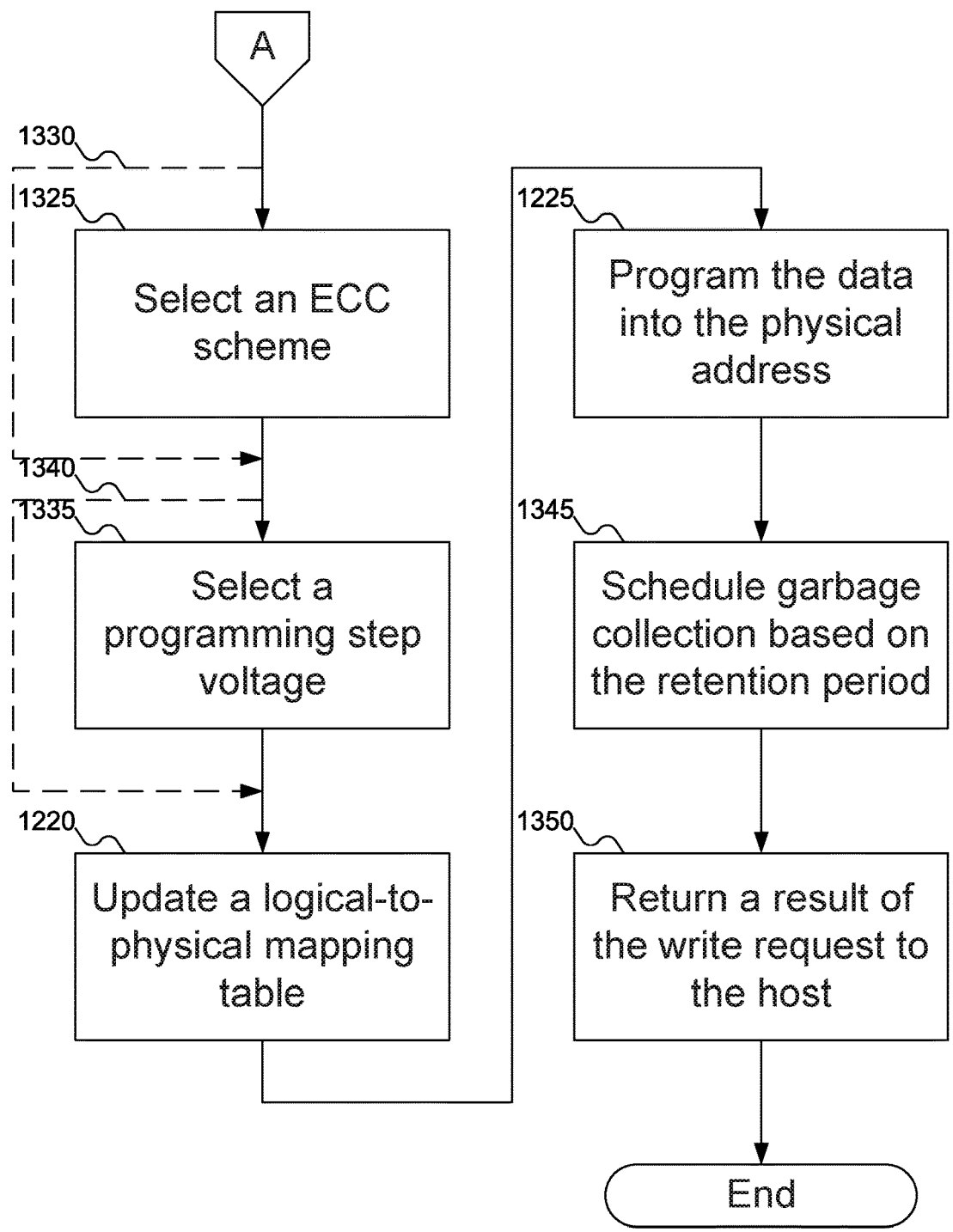
FIG. 13B continues the flowchart of FIG. 13A of another example procedure for the storage device of FIG. 1 to process a write request for data with a retention period, according to embodiments of the disclosure.

FIGS. 13A-13B show a flowchart of another example procedure for storage device 120 of FIG. 1 to process write request 515 of FIG. 5 for data 605 of FIG. 6 with retention period 615 of FIG. 6, according to embodiments of the disclosure. FIGS. 13A-13B are similar to FIG. 12, but more general and with some additional blocks. In FIG. 13A, at block 1305, storage device 120 of FIG. 1 may receive a configuration command from host 105 of FIG. 1. The configuration command may enable the host to manage the use of retention periods within storage device 120 of FIG. 1. For example, host 105 of FIG. 1 may use the configuration command to learn whether storage device 120 of FIG. 1 supports data retention periods and to enable or disable the use of data retention periods per I/O request within storage device 120 of FIG. 1. Host 105 of FIG. 1 may use the configuration command to establish a default retention period and/or a default number of extensions for write requests sent to storage device 120 of FIG. 1. Host 105 of FIG. 1 may use the configuration command to establish properties of write requests, such as a range of LBAs, a command identifier, a namespace identifier, a stream identifier, a zone namespace identifier, an identifier of submission queue 525-1 through 525-3 of FIG. 5, a date, a time, a protocol, a media access control identifier, a network parameter, or a storage device parameter, and how those various properties may be associated with different retention periods and/or numbers of extensions. Finally, host 105 of FIG. 1 may use the configuration command to retrieve data retention period log 1120 of FIG. 11 from storage device 120 of FIG. 1, to determine whether a read error was due to data being automatically invalidated or some other reason.

At block 1205, storage device 120 of FIG. 1 may receive write request 515 of FIG. 5 from host 105 of FIG. 1. Write request 515 of FIG. 5 may include data 605 of FIG. 6 and logical address 610 of FIG. 6, as specified by host 105 of FIG. 1. Write request 515 of FIG. 5 may also include retention period 615 of FIG. 6 and/or number of extensions 620 of FIG. 6. At block 1210, retention period determiner 530 of FIG. 5 may determine retention period 615 of FIG. 6 associated with write request 515 of FIG. 5. As discussed above with reference to FIG. 5, retention period 615 of FIG. 6 may be included with write request 515 of FIG. 5, retention period 615 of FIG. 6 may be determined based on some property of write request 515 of FIG. 5, or retention period 615 of FIG. 6 may be a default retention period for storage device 120 of FIG. 1. At block 1310, host write request handler 505 of FIG. 5 may place write request 515 of FIG. 5 in one of submission queues 525-1 through 525-3 of FIG. 5.

At block 1315, retention period determiner 530 of FIG. 5 may determine number of extensions 620 of FIG. 6. Block 1315 may be omitted, as shown by dashed line 1320. At block 1215, FTL 330 of FIG. 3 may select physical address 805 of FIG. 8 where data 605 of FIG. 6 is to be programmed in storage device 120 of FIG. 1. The selection of physical address 805 of FIG. 8 by FTL 330 of FIG. 3 may be based at least in part on retention period 615 of FIG. 6.

At block 1325 (FIG. 13B), ECC selector 540 of FIG. 5 may select ECC mode 1010-1 or 1010-2 of FIG. 10 to be used when encoding data 605 of FIG. 6. Block 1325 may be omitted, as shown by dashed line 1330. At block 1335, programming step voltage selector 550 of FIG. 5 may select a programming step voltage to be used when programming data 605 of FIG. 6 into flash memory chips 325-1 through 325-8 of FIG. 3. Block 1335 may be omitted, as shown by dashed line 1340.

At block 1220, FTL 330 of FIG. 3 (or host write request handler 505 of FIG. 5) may update logical-to-physical mapping table 565 of FIG. 5 to store logical address 610 of FIG. 6, physical address 805 of FIG. 8, and retention period 615 of FIG. 6. In embodiments of the disclosure where different ECC modes 1010-1 or 1010-2 of FIG. 10 or different programming step voltages are used, FTL 330 of FIG. 3 (or host write request handler 505 of FIG. 5) may also update logical-to-physical mapping table 565 of FIG. 5 to store ECC mode 810 of FIG. 8 and/or programming step voltage 815 of FIG. 8. At block 1225, flash controller 335 of FIG. 3 may program data 605 of FIG. 6 into physical address 805 of FIG. 8 in storage device 120 of FIG. 1.

At block 1345, garbage collection controller 570 of FIG. 5 may be scheduled to run based on retention period 615 of FIG. 6. Finally, at block 1350, flash controller 335 of FIG. 3 may return a result of the programming operation, and FTL 330 of FIG. 3 may return a result of write request 515 of FIG. 5 back to host 105 of FIG. 1.

Figure 14:
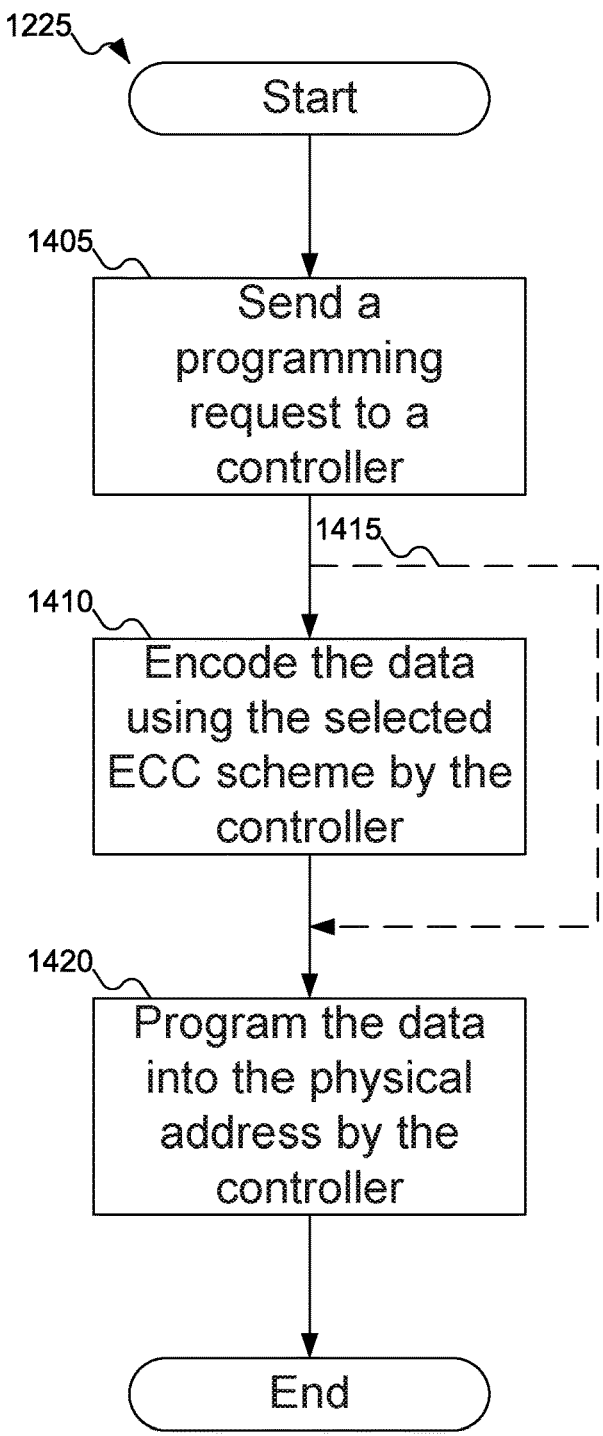
FIG. 14 shows a flowchart of an example procedure for the flash translation layer of FIG. 3 to send a request to the flash controller of FIG. 3 to program data using a retention period, according to an embodiment of the disclosure.

FIG. 14 shows a flowchart of an example procedure for FTL 330 of FIG. 3 to send a request to flash controller 335 of FIG. 3 to program data 605 of FIG. 6 using retention period 615 of FIG. 6, according to an embodiment of the disclosure. In FIG. 14, at block 1405, FTL 330 of FIG. 3 may send a programming request to flash controller 335 of FIG. 3 to program the data into flash memory chips 325-1 through 325-8 of FIG. 3. At block 1410, flash controller 335 of FIG. 3 may use ECC encoder/decoder 1010-1 or 1010-2 of FIG. 10 to encode the data. Block 1410 may be omitted, as shown by dashed line 1415, Finally, at block 1420, flash controller 335 of FIG. 3 may program the data into flash memory chips 325-1 through 325-8 of FIG. 3.

Figure 15:
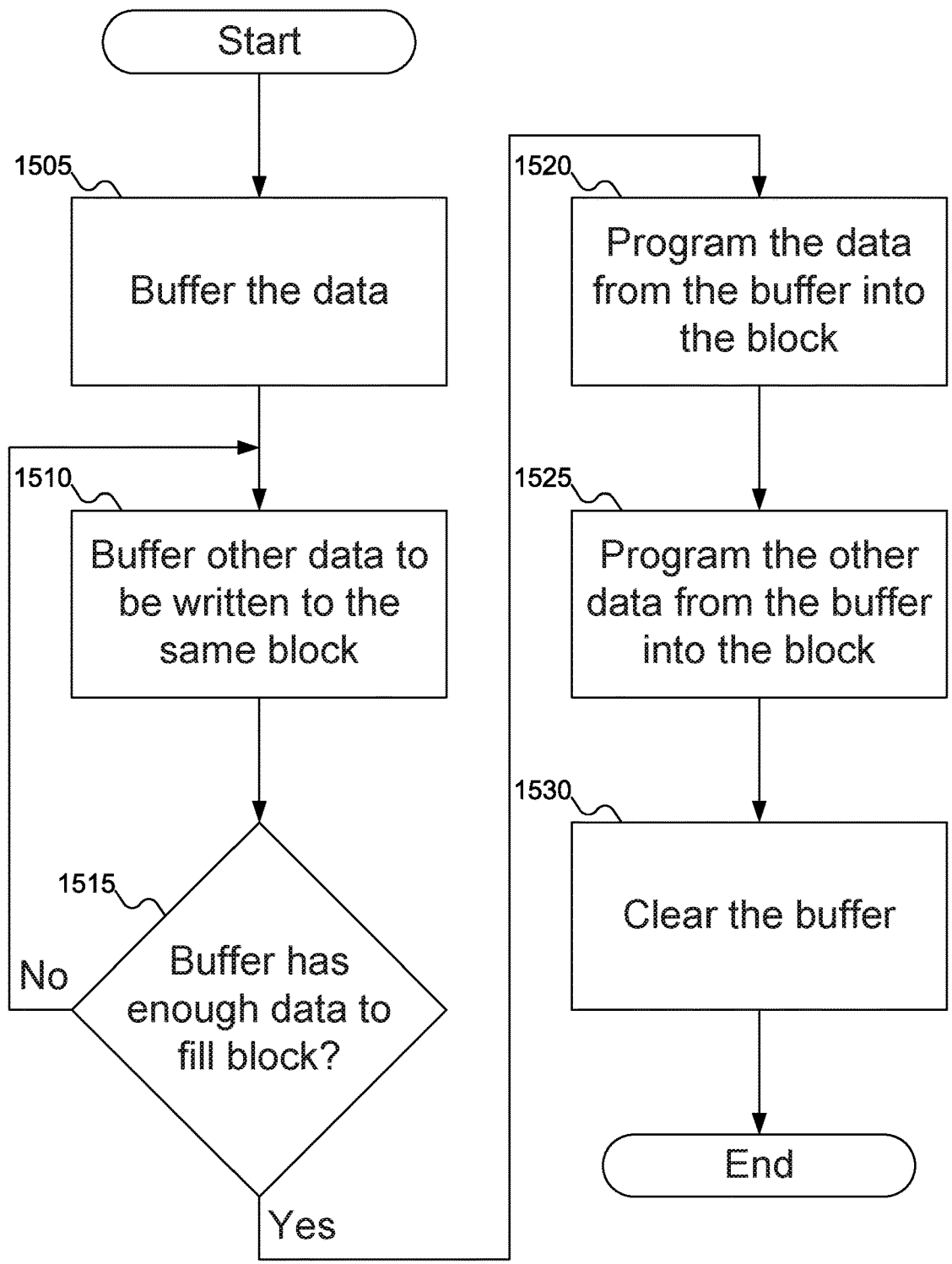
FIG. 15 shows a flowchart of an example procedure for the buffer of FIG. 5 to cache data until the buffer of FIG. 5 stores enough data to fill a block in the storage device of FIG. 1, according to an embodiment of the disclosure.

FIG. 15 shows a flowchart of an example procedure for buffer 535 of FIG. 5 to cache data until buffer 535 of FIG. 5 stores enough data to fill a block in storage device 120 of FIG. 1, according to an embodiment of the disclosure. In FIG. 15, at block 1505, buffer 535 of FIG. 5 may buffer the data received in write request 515 of FIG. 5. At block 1510, buffer 535 of FIG. 5 may buffer data from another write request 515 of FIG. 5 that is to be programmed to the same block. At block 1515, FTP 330 of FIG. 3 may check to see if buffer 535 of FIG. 5 contains enough data to fill a block (at least, a block's worth of data to be programmed into a single block: buffer 535 of FIG. 5 may buffer data to be written to multiple different blocks). If not, then control returns to block 1510 to wait for more data to be stored in buffer 535 of FIG. 5.

If there is enough data in buffer 535 of FIG. 5 to fill a particular block, then at block 1520, flash controller 335 of FIG. 3 may program data 605 of FIG. 6 from the first write request 515 of FIG. 5 into the target block, and at block 1525 flash controller 335 of FIG. 3 may program data 605 of FIG. 6 from the second write request 515 of FIG. 5 into the target block. (If there is more data from other write requests to be programmed into the target block, other similar operations to blocks 1520 and 1525 may also be performed.) Finally, at block 1530 buffer 535 of FIG. 5 may be cleared (at least, of the data that was programmed into the target block: if buffer 535 of FIG. 5 stores other data to be programmed into other blocks, that data may remain in buffer 535 of FIG. 5).

Figure 16:
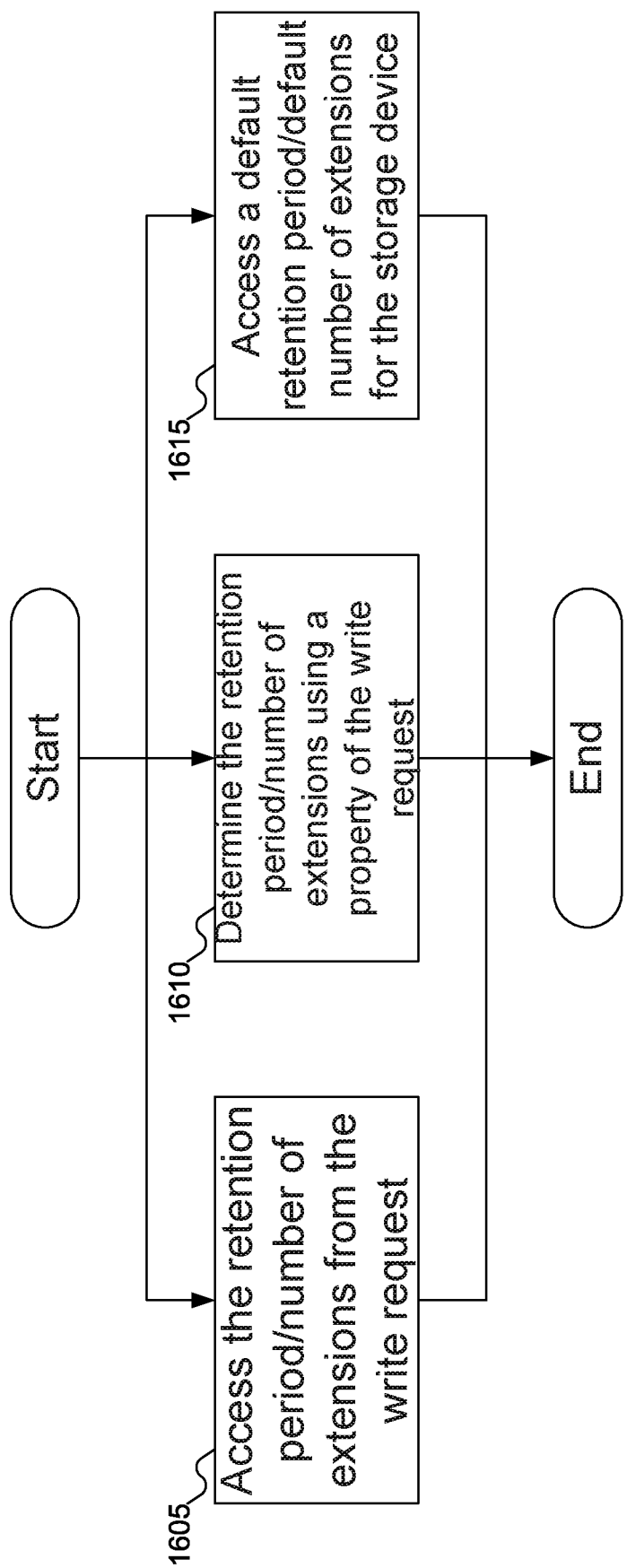
FIG. 16 shows a flowchart of an example procedure of different ways for the flash translation layer of FIG. 5 to determine the retention period for data, according to embodiments of the disclosure.

FIG. 16 shows a flowchart of an example procedure of different ways for FTL 330 of FIG. 3 to determine retention period 615 of FIG. 6 for data 605 of FIG. 6, according to embodiments of the disclosure. In FIG. 16, at block 1605, retention period determiner 530 of FIG. 5 may access retention period 615 of FIG. 6 and/or number of extensions from write request 515 of FIG. 5. Alternatively, at block 1610, retention period determiner 530 of FIG. 5 may determine a property of write request 515 of FIG. 5 and use that property to determine retention period 615 of FIG. 6 and/or number of extensions 620 of FIG. 6. Alternatively, at block 1615, retention period determiner 530 of FIG. 5 may access a default retention period 615 of FIG. 6 and/or default number of extensions 620 of FIG. 6 for storage device 120 of FIG. 1. Note that these options may be mixed: for example, retention period determiner might use a default number of extensions but access retention period 615 of FIG. 6 from write request 515 of FIG. 5. Other combinations are also possible.

Figure 17A:
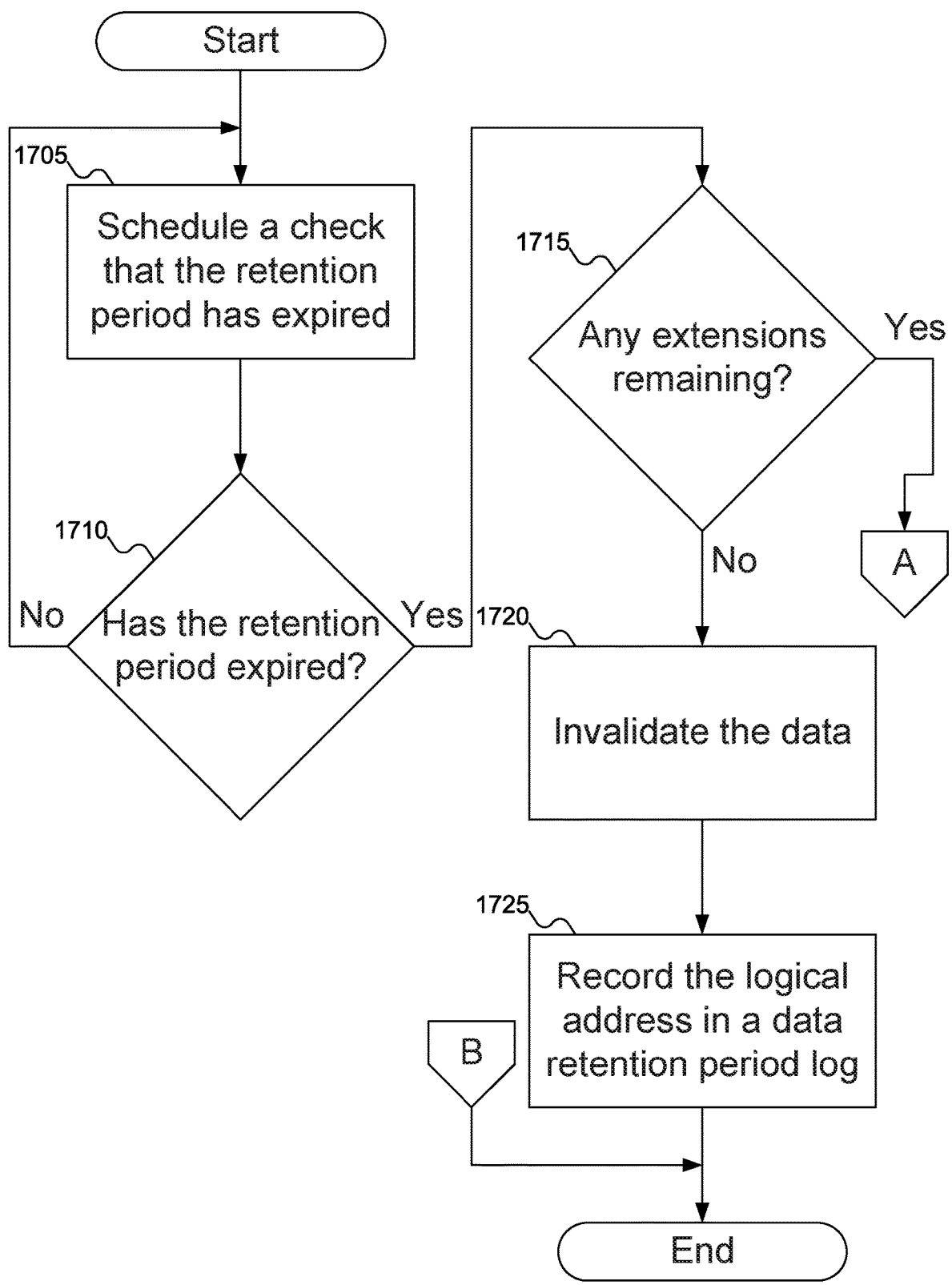
FIG. 17A shows a flowchart of an example procedure for determining whether to renew a retention period for data in the storage device of FIG. 1, according to embodiments of the disclosure.
Figure 17B:
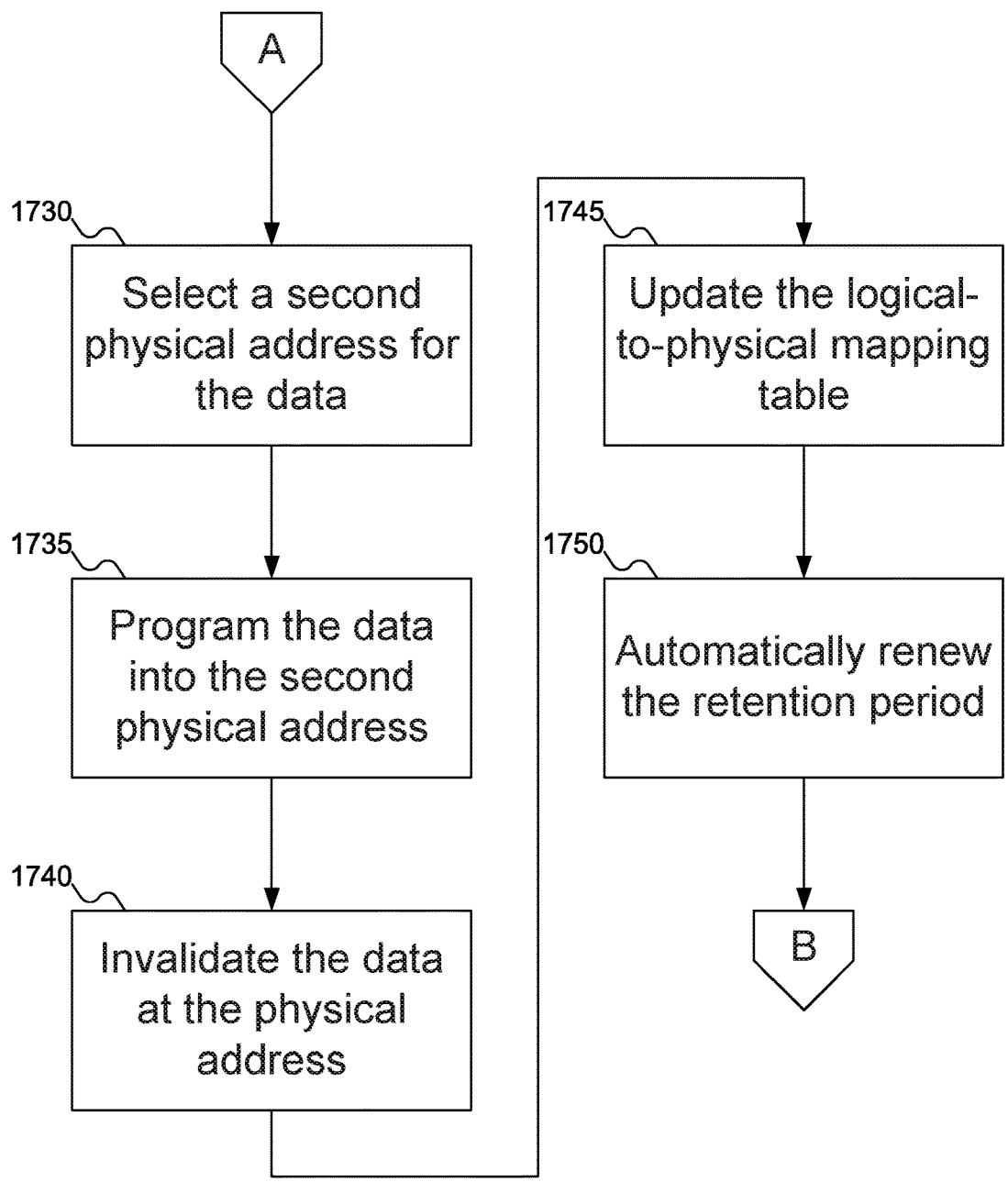
FIG. 17B continues the flowchart of FIG. 17A of an example procedure for determining whether to renew a retention period for data in the storage device of FIG. 1, according to embodiments of the disclosure.

FIGS. 17A-17B show a flowchart of an example procedure for determining whether to renew retention period 615 of FIG. 6 for data 605 of FIG. 6 in storage device 120 of FIG. 1, according to embodiments of the disclosure. In FIG. 17A, at block 1705, extension tracker 1705, extension tracker 555 of FIG. 5 may schedule a check to determine if retention period 615 of FIG. 6 has expired. At block 1710, upon the arrival of the scheduled time, extension tracker 555 of FIG. 5 may check to see if retention period 615 of FIG. 6 has expired. If not, then processing may return to block 1705 to schedule another check later.

If retention period 615 of FIG. 6 has expired, then at block 1715 extension tracker 555 of FIG. 5 may check to see if there are any extensions remaining. If not, then at block 1720 flash controller 335 of FIG. 3 may invalidate data 605 of FIG. 6, and at block 1725 logger 560 of FIG. 5 may log the invalidation of the data in data retention period log 1120 of FIG. 11. (Extension tracker 555 of FIG. 5 may also remove the entry from logical-to-physical mapping table 565 of FIG. 5 for data 605 of FIG. 6, since the data is no longer validly stored in storage device 120 of FIG. 1.)

On the other hand, if there is an extension remaining, then at block 1730 (FIG. 17B), FTL 330 of FIG. 3 may select another physical address 805 of FIG. 8 for data 605 of FIG. 6. At block 1735, flash controller 335 of FIG. 3 may program data 605 of FIG. 6 to new physical address 805 of FIG. 8. At block 1740, flash controller 335 of FIG. 3 may invalidate data 605 of FIG. 6 at original physical address 805 of FIG. 8. At block 1745, FTL 330 of FIG. 3 may update logical-to-physical mapping table 565 of FIG. 5 to reflect physical address 805 of FIG. 8 where data 605 of FIG. 6 may be stored. Finally, at block 1750, extension tracker 555 of FIG. 5 may renew the retention period, as discussed with reference to FIG. 18 below.

Figure 18:
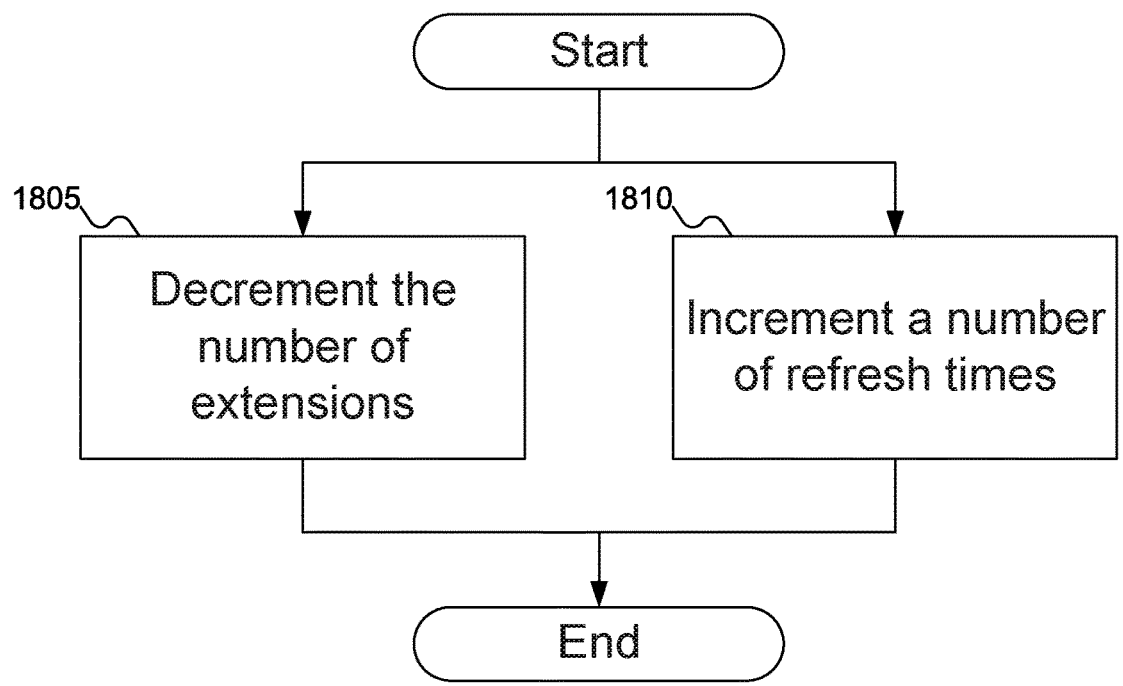
FIG. 18 shows a flowchart of an example procedure for the storage device of FIG. 1 to track extensions of the retention period for data in the storage device of FIG. 1, according to embodiments of the disclosure.

FIG. 18 shows a flowchart of an example procedure for storage device 120 of FIG. 1 to track extensions of retention period 615 of FIG. 6 for data 605 of FIG. 6 in storage device 120 of FIG. 1, according to embodiments of the disclosure. In FIG. 18, at block 1805, extension tracker 555 of FIG. 5 may decrement number of extensions 620 of FIG. 6. Alternatively, at block 1810, extension tracker 555 of FIG. 5 may increment number of refresh times 820 of FIG. 8.

Figure 19:
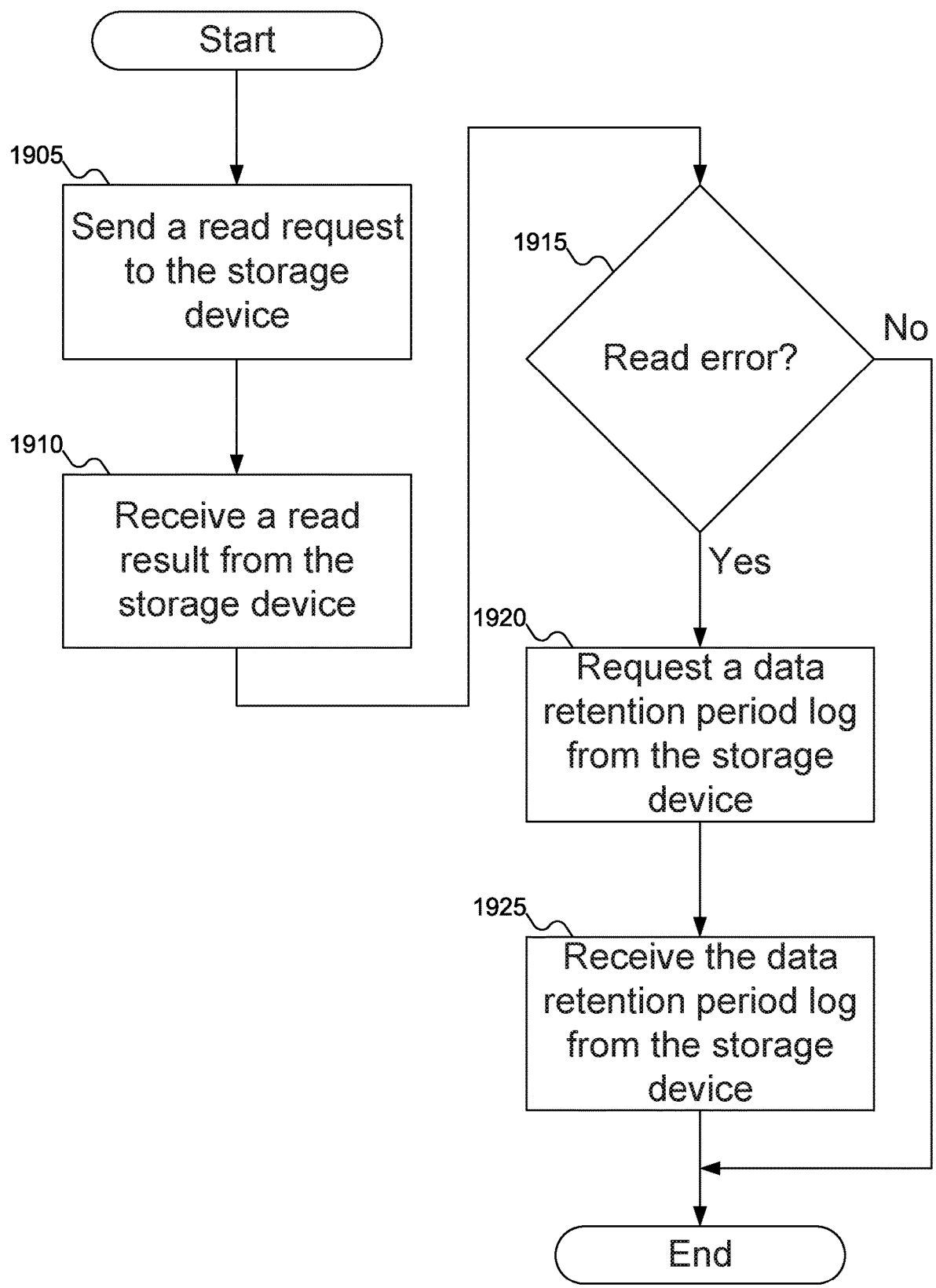
FIG. 19 shows a flowchart of an example procedure for the host of FIG. 1 to learn about data being invalidated by the storage device of FIG. 1, according to embodiments of the disclosure.

FIG. 19 shows a flowchart of an example procedure for host 105 of FIG. 1 to learn about data 605 of FIG. 6 being invalidated by storage device 120 of FIG. 1, according to embodiments of the disclosure. In FIG. 19, at block 1905, host 105 of FIG. 1 may send read request 520 of FIG. 5 to storage device 120 of FIG. 1. At block 1910, host 105 of FIG. 1 may receive a read result from storage device 120 of FIG. 1.

At block 1915, host 105 of FIG. 1 may check to see if the read result was read error 1105 of FIG. 11. If the read result was read error 1105 of FIG. 11, then at block 1920 host 105 of FIG. 1 may send data retention period log request 1110 of FIG. 11. At block 1925, host 105 of FIG. 1 may receive data retention period log response 1115 of FIG. 11 from storage device 120 of FIG. 1. Data retention period response 1115 of FIG. 11 may include data retention period log 1120 of FIG. 11, so that host 105 of FIG. 1 may check to see if read error 1105 of FIG. 11 was due to data 605 of FIG. 6 being automatically invalidated by storage device 120 of FIG. 1 or due to some other reason.

Figure 20:
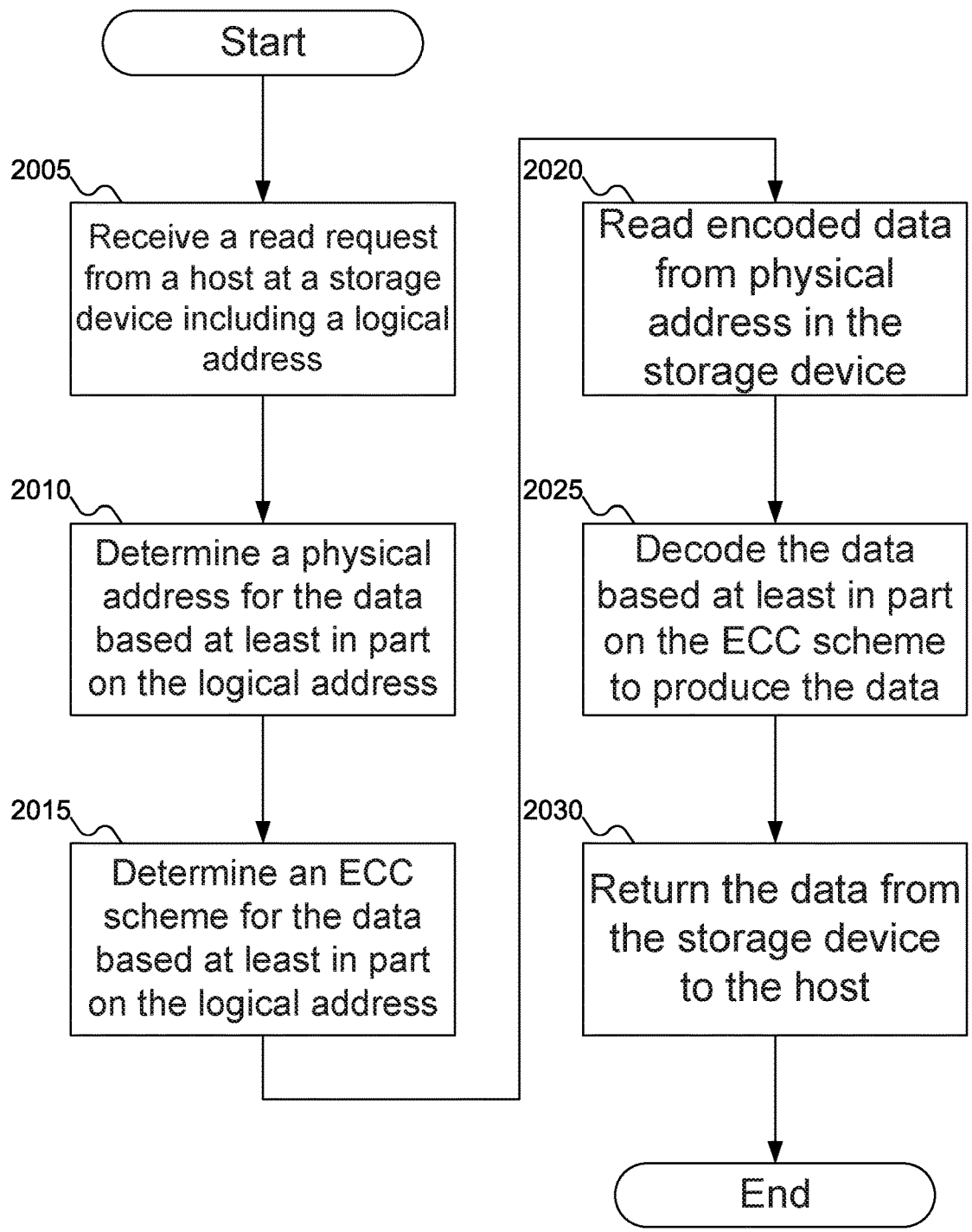
FIG. 20 shows a flowchart of an example procedure for the storage device of FIG. 1 to process a read request for data with a retention period, according to embodiments of the disclosure.

FIG. 20 shows a flowchart of an example procedure for storage device 120 of FIG. 1 to process read request 520 of FIG. 5 for data 605 of FIG. 6 with retention period 615 of FIG. 6, according to embodiments of the disclosure. In FIG. 20, at block 2005, FTL 330 of FIG. 3 may receive read request 520 of FIG. 5 from host 105 of FIG. 1. Read request 520 of FIG. 5 may include logical address 610 of FIG. 7 of data 605 of FIG. 6 to be read from storage device 120 of FIG. 1. At block 2010, host read request handler 510 of FIG. 5 may determine physical address 805 of FIG. 8 of data 605 of FIG. 6 using logical address 610 of FIG. 7. Host read request handler 510 of FIG. 5 may use logical-to-physical mapping table 565 of FIG. 5 to determine physical address 805 of FIG. 8 for data 605 of FIG. 6. At block 2015, host read request handler 510 of FIG. 5 may determine ECC mode 810 of FIG. 8 used to encode data 605 of FIG. 6 using logical address 610 of FIG. 7. Host read request handler 510 of FIG. 5 may use logical-to-physical mapping able 565 of FIG. 5 to determine ECC mode 810 of FIG. 8 for data 605 of FIG. 6. Note that in some embodiments of the disclosure, block 2015 may be omitted.

At block 2020, flash controller 335 of FIG. 3 may read encoded data at physical address 805 of FIG. 8 of storage device 120 of FIG. 1. At block 2025, flash controller 335 of FIG. 3 may use ECC encoders/decoders 1010-1 or 1010-2 of FIG. 10 to decode the encoded data, thereby producing data 605 of FIG. 6. Note that in some embodiments of the disclosure, if the data was not encoded (and block 2015 omitted), block 2025 may also be omitted. Finally, at block 2030, flash controller 335 of FIG. 3 may return data 605 of FIG. 6 to FTL 330 of FIG. 3, which may in turn return data 605 of FIG. 6 to host 105 of FIG. 1.

Figure 21:
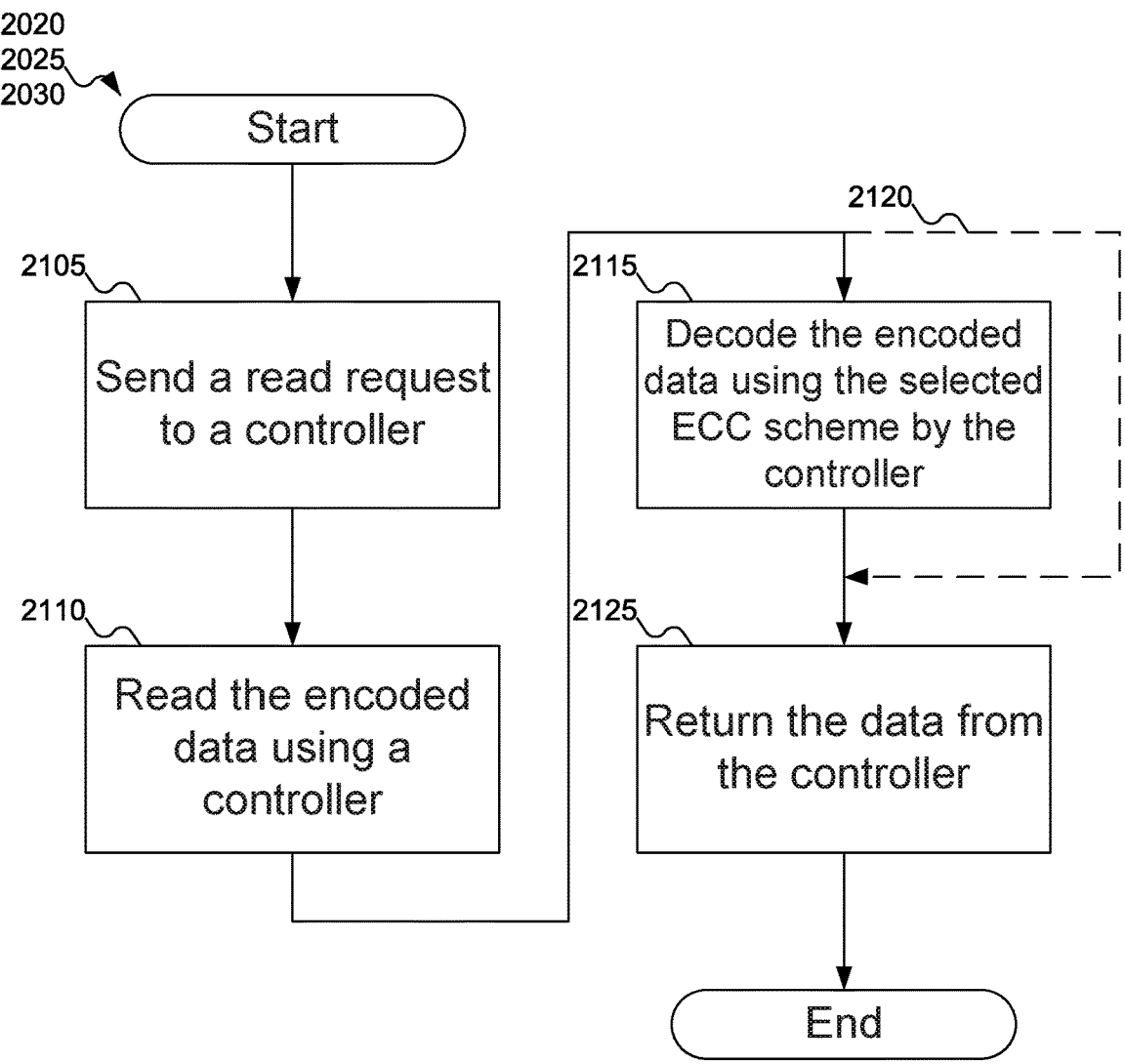
FIG. 21 shows a flowchart of an example procedure that further elaborates on the flowchart of the example procedure shown in FIG. 20, according to an embodiment of the disclosure.

FIG. 21 shows a flowchart of an example procedure that further elaborates on the flowchart of the example procedure shown in FIG. 20, according to an embodiment of the disclosure. In FIG. 21, at block 2105, FTL 330 of FIG. 3 may send a read request to flash controller 335 of FIG. 3. At block 2110, flash controller 335 of FIG. 3 may read the encoded data. At block 2115, flash controller 335 of FIG. 3 may use ECC encoders/decoders 1010-1 or 1010-2 of FIG. 10 to decode the encoded data. Note that if data 605 of FIG. 6 is stored without being encoded, block 2115 may be omitted, as shown by dashed line 2120. Finally, at block 2125, flash controller 335 of FIG. 3 may return the data to FTL 330 of FIG. 3.

Figure 22:
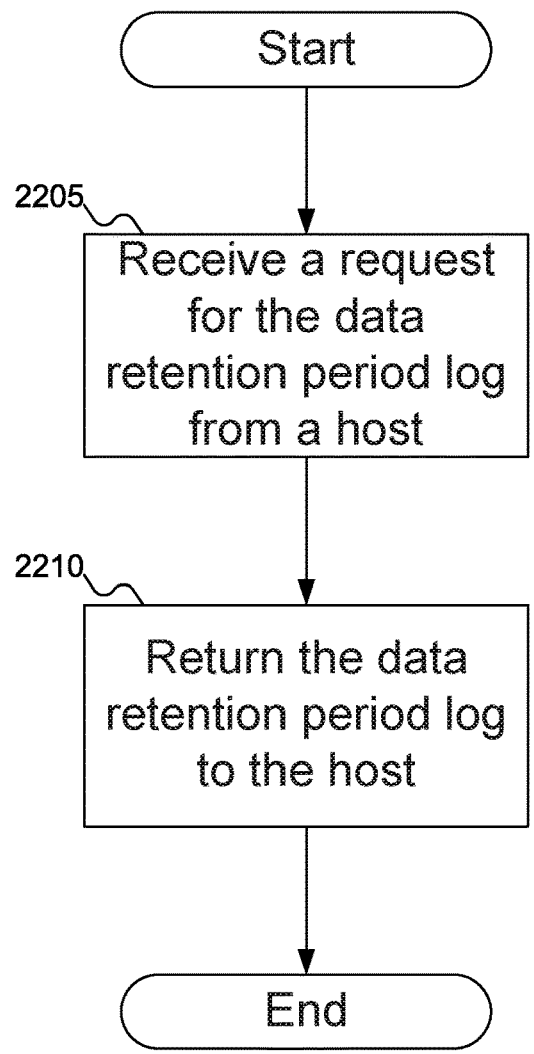
FIG. 22 shows a flowchart of an example procedure for the storage device of FIG. 1 to process a request for the data retention period log of FIG. 11, according to an embodiment of the disclosure.

FIG. 22 shows a flowchart of an example procedure for storage device 120 of FIG. 1 to process data retention period log request 1110 of FIG. 11 for data retention period log 1120 of FIG. 11, according to an embodiment of the disclosure. At block 2205, storage device 120 of FIG. 1 may receive data retention period log request 1110 of FIG. 11 from host 105 of FIG. 1. At block 2210, storage device 120 of FIG. 1 may return data retention period log 1120 of FIG. 11 to host 105 of FIG. 1, for example, as part of data retention period log response 1115 of FIG. 11

In FIGS. 12-22, some embodiments of the disclosure are shown. But a person skilled in the art will recognize that other embodiments of the disclosure are also possible, by changing the order of the blocks, by omitting blocks, or by including links not shown in the drawings. All such variations of the flowcharts are considered to be embodiments of the disclosure, whether expressly described or not.

Solid State Drives (SSDs), such as storage device 120 of FIG. 1, are being used in more applications in the data center than before. SSD performance may become important for data storage and processing. SSDs store data in Not-And (NAND) flash memory. There are different types of flash memory, e.g., single level cell (SLC), multi-level cell (MLC), triple level cell (TLC), quad level cell (QLC), etc., and various manufacturing processes. An SSD controller may manage the flash memory and provides access to the data to a host to which that SSD is attached to.

A host interface may be used by the host to communicate with the SSDs. Data write and read input/output (I/O) commands, as well as various media management commands such as Identify, Get Log, etc., may be issued over this interface. The same interface may be used by the SSDs to perform data transfers to and from host system memory.

The Flash Translation Layer (FTL) may provide a mapping between logical addresses used by host and physical addresses of the data on the flash memory. The NAND flash memory may be read or written at the granularity of a flash page, often 8 to 16 KB in typical NAND flash devices, but smaller and/or larger page sizes may also be used. Before the flash memory page may be reprogrammed with new data, it may be erased first. The granularity of erase is per NAND block: there may be 128 to 256 pages in each block, but a block may include fewer or more pages as well. Because the granularity of erase and program are different, additional work may be performed to migrate valid pages to a new block before erase the old block. Garbage collection (GC) is the process of freeing up partially filled blocks and making room for more data. The main goal of garbage collection is to identify one of the fragmented flash blocks, where most of its pages are invalid, and to erase the entire block. When garbage collection is completed, the page may be recycled and add to a free list in the FTL.

The number of times flash memory may be programmed and erased may be finite. This limit may be described as the maximum number of program/erase cycles (P/E cycles) flash memory may sustain over the life of the flash memory. The SSD controller may attempt to evenly distribute write operations across all the blocks to maximize the lifetime of SSD drive: this process may be known as wear-leveling. A wear-leveling algorithm may select a new block from the free list when data is going to be programmed. One simple approach is to select the block in the free list with the lowest number of P/E cycles to minimize the variance of wear-out across blocks.

Due to the way flash memory works (using garbage collection and wear-leveling, for example), the amount of data that is erased and rewritten may be larger than the actual data written by the host. Each time data are relocated without being changed by the host system, this relocation increases the write amplification and reduces the life of flash memory. Write amplification may be measured by the ratio of writes committed to the flash memory to the writes coming from the host system. The FTL may perform various background operations like garbage collection and wear-leveling. So host I/O commands may co-exist with background operations, and these two types of flash access may compete with each other for flash bandwidth. The overhead associated with performing additional program/erase cycles may impact performance. The FTL may attempt to optimize garbage collection and wear-leveling to improve efficiency and leave more bandwidth for host write and read operations.

Flash interface 1015 of FIG. 10 may perform read and write data operations on flash memory. Different flash dies may do read, write, and erase operations in parallel and independently of each other. The flash interface may also perform data encoding and error correction as appropriate for data reliability. The most common error correction codes (ECC) used by SSD controllers are Bose-Chaudhuri-Hocquenghem (BCH) and low-density parity check (LDPC), but other ECCs may also be used. LDPC is more powerful in error correction capability than BCH code and may have a longer retention guarantee. But LDPC may be more complex to implement, may have a longer encoding and decoding latency, and may require more power. LDPC may be more reliable for longer retention period data. BCH may offer higher bandwidth and lower cost for shorter retention period data.

Flash interface 1015 of FIG. 10 may perform the direct memory access (DMA) from the flash controller to the flash memory. To program a flash page, the flash interface may increase the programming voltage of NAND flash cells step-by-step by a certain increment ($\Delta V$), and may stop once the voltage is greater than the desired threshold voltage. The smaller the $\Delta V$ is, the more precise the target voltage is. With a larger programming step voltage, fewer steps are used during programming procedure. Thus, the selection of the programming step voltage may involve a potential tradeoff between precision and speed.

All the functions described above may affect the performance, reliability, and endurance of flash memory, and thus the SSD as a whole. Without knowing the data retention period, more retention errors may need to be tolerated. More bandwidth, power, and resources may therefore be used to meet the retention requirement.

An SSD architecture, for a storage device such as storage device 120 of FIG. 1, for executing I/O commands, such as Non-Volatile Memory Express (NVMe) write with a specified data retention period (DRP), may be used. The architecture may enable a host to specify the estimated data retention period of the program data for the given command. Such a feature may enable efficient data management by FTL, improving the endurance of flash memory. The architecture may also help speed up the flash program and read operations and further improve the overall SSD performance.

SSD controller 315 may perform data transfers between host system memory and the persistent flash memory for I/O commands. The I/O write commands may specify the destination logical block addresses (LBAs) and number of blocks to be programmed. The FTL may translate the host LBAs to flash physical block addresses and perform the DMA from SSD controller to flash memory array. The FTL may use the following two parameters for allocating the target flash memory address for each I/O: 1) DRP; and 2) retention period extension times (RPET).

The data retention period may be the estimated lifetime for the data as specified by host. As the retention period expires, the host may read and reprogram the data to extend the period or invalidate the data. The SSD controller may extend the data retention period by the times specified in RPET before invalidating the data.

DRP on a per-command basis may help allocate data with similar retention period in nearby blocks in flash memory. Host write command handler 505 of FIG. 5 in the FTL may categorize free flash pages into one or more queues (or pools) based on data retention periods, e.g., 1 day, 1 week, 1 month, 1 year, over 1 year, etc. The pages within a queue or pool may be physically joint sets of pages. When a host command arrives, the FTL may check the data retention period in the command and select an available physical page from the corresponding queue or pool. After logging the page address in the logical-to-physical (L2P) table, the FTL may trigger the flash interface controller to program the data to the pre-selected page. Thus, short retention period data blocks may be separated from blocks that contain long retention period data. Since data within a block may expire at around a common time, the block may be recycled in one shot and unnecessary data movement during garbage collection may be minimized. Under ideal situation, write amplification may be reduced close to its minimum value of 1. This fact in turn may reduce the background data traffic and reserve more resources and flash channel bandwidth for host read and write operations.

Data blocks that are frequently overwritten do not need to be recycled frequently. For data that has a short retention period, garbage collection operations may be avoided. By grouping the blocks based on data retention time, the garbage collection efficiency may be improved and the blocks' P/E cycles may be reduced. Moreover, by allocating young blocks (lower P/E cycles) to long retention period queues and old blocks (higher P/E cycles) to short retention period queues, more optimal wear-leveling may be achieved.

DRP on a per-command basis may also facilitate an increase in data program and read speed. Different ECC codes may have different data encoding and decoding latencies. LDPC is more powerful in error correction capability than the BCH code. But the LDPC algorithm may be more complex to implement, may have a longer encoding and decoding latency, and may consume more power than the BCH code. For short retention period data, fewer retention errors may need to be tolerated. Therefore, BCH may be strong enough to protect the data within capability for short retention period data. Using BCH to encode/decode such data may enable faster encoding/decoding speed and lower power consumption. FTL 330 of FIG. 3 may select the ECC mode based upon the DRP for each command before triggering flash DMA.

Besides using different ECC modes, the data programming step voltage may be optimized according to DRP to speed up the data programming process. Write speed may be improved by adopting larger program step voltage values. With a larger programming step voltage, fewer steps may be needed during a programming procedure. Thus, a larger programming step voltage may speed up the programming operation, but may also reduce the margin for tolerating retention errors. Thus, applying a larger program voltage step for short retention period data may help expedite the program process.

FTL 330 of FIG. 3 may write the data retention period, ECC mode, and program voltage mode along with logical and physical address to the L2P table before programming to flash memory. Table 1 shows one example of the information included in L2P table.

supported; 2) DRP length supported, e.g., one day, one week, one month, one year, over one year, etc.; 3) maximum RPET supported.

When the NVMe driver and system software reads the Identify data structure, the NVMe driver and system software may understand that the connected SSD controller may support DRP per I/O. The driver may then configure and enable DRP per I/O feature in the SSD controller using Set Feature/Get Feature commands. Once the DRP per I/O feature is enabled, NVMe driver and system software may insert DRP and maximum RPET into the NVMe Write commands. The FTL may log the LBA of data when the DRP has expired. The host may then access the log using an NVMe Get Log Page command.

In another embodiment of the disclosure, it may be possible for host 105 of FIG. 1 to specify and set the DRP and RPET values on other than per-I/O granularity. Some examples of storage and network parameters on which basis a host may specify DRP and RPET values are: LBA range, command ID, namespace ID, stream ID, zone namespace (ZNS) ID, host ID, submission queue ID (SQID), date, time, Transmission Control Protocol/Internet Protocol (TCP/IP), Ethernet media access control (MAC) ID etc. The host may use Set Feature/Get Feature commands to set these parameters in SSD.

In yet another embodiment of the disclosure, it may be possible for SSD device 120 of FIG. 3 itself to specify and set the DRP and RPET values on other than per-I/O granu-

TABLE 1

| Extracted from NVMe command | | | Filled by FTL | | | |
|---|---|---|---|---|---|---|
| Logical Address | Data Retention Period | Retention Period Extension Times | Physical Address (PBA) | ECC Mode | Program Voltage Step Mode | Retention Period Refreshed Times |
| 0000 | 1 D | x3 | Die 0, Block 1, Address 0x0001_0000 | BCH | Large | x0 |
| 0010 | 1 D | x3 | Die 0, Block1, Address 0x0001_0004 | BCH | Large | x1 |
| 1005 | 1 W | x1 | Die 0, Block5, Address 0x0005_0330 | BCH | Medium | x0 |
| 1206 | 1 W | x1 | Die 0, Block6, Address 0x0006_0470 | BCH | Medium | x0 |
| 2030 | 1 M | x1 | Die 0, Block10, Address 0x0010_0200 | LDPC | Small | x0 |
| 2049 | 1 M | x3 | Die 0, Block10, Address 0x0010_0570 | LDPC | Small | x1 |
| 3112 | 1 Y | x0 | Die 0, Block15, Address 0x0015_0011 | LDPC | Small | x0 |
| 4557 | 1 Y | x0 | Die 0, Block15, Address 0x0015_0300 | LDPC | Small | x0 |
| 7880 | >1 Y | x0 | Die 0, Block20, Address 0x0020_9000 | LDPC | Small | x0 |
| 8990 | >1 Y | x0 | Die 0, Block21, Address 0x0021_0375 | LDPC | Small | x0 |

SSD controller 315 of FIG. 3 may advertise the support for DRP per I/O feature through an Identify data structure. The following fields are some examples of the information exposed through Identify data structure: 1) DRP per I/O larity. Some examples of storage and network parameters an SSD may use to specify DRP and RPET values are: LBA range, command ID, namespace ID, stream ID, ZNS ID, host ID, SQID, date, time, TCP/IP, Ethernet MAC ID etc.

Such device specified parameter values may be read by a host using Identify and/or Set Feature/Get Feature commands.

Embodiments of the disclosure offer technical advantages over the prior art. By using data retention periods, a storage device may be better able to determine where to program data when written by an application to minimize (or potentially eliminate) programming data during garbage collection. The storage device may also use information about the retention period in determining how to program the data—for example, by selecting an appropriate error correcting code and/or a programming step voltage. The storage device may also automatically invalidate data when the retention period has expired, rather than retaining the detail indefinitely (and potentially having to program the data into new locations unnecessarily). The storage device may log such data invalidation, in case the host requests to know why data was invalidated without instruction from the application. In addition, by using extensions, the storage device may automatically renew data whose retention period has expired (rather than invalidating the data).

The following discussion is intended to provide a brief, general description of a suitable machine or machines in which certain aspects of the disclosure may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present disclosure may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the disclosure may include a tangible, non-transitory machine-readable medium comprising instructions executable by one or more processors, the instructions comprising instructions to perform the elements of the disclosures as described herein.

The various operations of methods described above may be performed by any suitable means capable of performing the operations, such as various hardware and/or software component(s), circuits, and/or module(s). The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Having described and illustrated the principles of the disclosure with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the disclosure" or the like are used herein, these phrases are meant to generally reference embodiment possibilities, and are not intended to limit the disclosure to particular embodiment configurations. As used herein, these terms may reference the same or different embodiments that are combinable into other embodiments.

The foregoing illustrative embodiments are not to be construed as limiting the disclosure thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this disclosure as defined in the claims.

Embodiments of the disclosure may extend to the following statements, without limitation:

Statement 1. An embodiment of the disclosure includes a storage device, comprising:
  a host interface to receive a write request from a host, the write request including a data and a logical address of the data;
  a first storage for the data;
  a retention period determiner to determine a retention period for the data;

a translation layer to select a physical address in the first storage to store the data based at least in part on the retention period;

a second storage for a logical-to-physical mapping table to map the logical address to the physical address and the retention period; and a controller to program the data into the physical address in the first storage.

Statement 2. An embodiment of the disclosure includes the storage device according to statement 1, wherein:

the storage device includes a Solid State Drive (SSD);

the first storage includes flash storage; and the translation layer includes a flash translation layer (FTL).

Statement 3. An embodiment of the disclosure includes the storage device according to statement 2, wherein:

the flash storage includes a block;

the FTL is configured to select a physical address in the block in the flash storage to store the data based at least in part on the retention period;

the logical-to-physical mapping table maps the logical address to the physical address in the block and the retention period; and the controller includes a flash interface to program the data into the physical address in the block in the flash storage.

Statement 4. An embodiment of the disclosure includes the storage device according to statement 2, wherein:

the FTL includes a buffer to store the data and a second data; and the FTL is configured to instruct the flash interface to program the data and the second data into the physical address in the block in the flash storage based at least in part on the buffer storing enough data to fill the block.

Statement 5. An embodiment of the disclosure includes the storage device according to statement 2, wherein the block includes a second data, the second data including the retention period.

Statement 6. An embodiment of the disclosure includes the storage device according to statement 1, wherein the translation layer includes the second storage.

Statement 7. An embodiment of the disclosure includes the storage device according to statement 1, wherein the write request includes the retention period.

Statement 8. An embodiment of the disclosure includes the storage device according to statement 1, wherein the retention period determiner is configured to determine the retention period based at least in part on a property of the write request.

Statement 9. An embodiment of the disclosure includes the storage device according to statement 1, wherein the property of the write request is at least one of a range of logical block addresses (LBAs), a command identifier, a namespace identifier, a stream identifier, a zone namespace identifier, an identifier of a submission queue, a date, a time, a protocol, a media access control identifier, a network parameter, or a storage device parameter.

Statement 10. An embodiment of the disclosure includes the storage device according to statement 1, wherein the retention period determiner is configured to access a default retention period of the storage device as the retention period.

Statement 11. An embodiment of the disclosure includes the storage device according to statement 1, wherein the retention period is one of at least the retention period and a second retention period.

Statement 12. An embodiment of the disclosure includes the storage device according to statement 1, wherein the translation layer includes an error correction code (ECC) selector to select a first ECC mode from at least the first ECC mode and a second ECC mode based at least in part on the retention period.

Statement 13. An embodiment of the disclosure includes the storage device according to statement 12, wherein the ECC selector is configured to select the first ECC mode from a table including at least the first ECC mode and the second ECC mode based at least in part on the retention period.

Statement 14. An embodiment of the disclosure includes the storage device according to statement 12, wherein the logical-to-physical mapping table further maps the logical address to the first ECC mode.

Statement 15. An embodiment of the disclosure includes the storage device according to statement 12, wherein the controller is configured to encode the data based at least in part on the first ECC mode to produce an encoded data and to program the encoded data into the physical address in the first storage.

Statement 16. An embodiment of the disclosure includes the storage device according to statement 12, wherein the translation layer further includes a programming step voltage selector to select a first programming step voltage from at least the first programming step voltage and a second programming step voltage based at least in part on the retention period.

Statement 17. An embodiment of the disclosure includes the storage device according to statement 16, wherein the programming step voltage selector is configured to select the first programming step voltage from a table including at least the first programming step voltage and the second programming step voltage based at least in part on the retention period.

Statement 18. An embodiment of the disclosure includes the storage device according to statement 16, wherein the logical-to-physical mapping table further maps the logical address to the first programming step voltage.

Statement 19. An embodiment of the disclosure includes the storage device according to statement 16, wherein the controller is configured to encode the data based at least in part on the first ECC mode to produce an encoded data and to program the encoded data into the physical address in the first storage based at least in part on the first programming step voltage.

Statement 20. An embodiment of the disclosure includes the storage device according to statement 1, wherein the translation layer includes a programming step voltage selector to select a first programming step voltage from at least the first programming step voltage and a second programming step voltage based at least in part on the retention period.

Statement 21. An embodiment of the disclosure includes the storage device according to statement 20, wherein the programming step voltage selector is configured to select the first programming step voltage from a table including at least the first programming step voltage and the second programming step voltage based at least in part on the retention period.

Statement 22. An embodiment of the disclosure includes the storage device according to statement 20, wherein the logical-to-physical mapping table further maps the logical address to the first programming step voltage.

Statement 23. An embodiment of the disclosure includes the storage device according to statement 20, wherein the controller is configured to program the data into the physical address in the first storage based at least in part on the first programming step voltage.

Statement 24. An embodiment of the disclosure includes the storage device according to statement 1, wherein the translation layer includes an extension tracker to track the expiration of the retention period.

Statement 25. An embodiment of the disclosure includes the storage device according to statement 24, wherein the translation layer is configured to determine a number of extensions.

Statement 26. An embodiment of the disclosure includes the storage device according to statement 25, wherein the write request further includes the number of extensions.

Statement 27. An embodiment of the disclosure includes the storage device according to statement 25, wherein the translation layer is configured to determine the number of extensions based at least in part on a property of the write request.

Statement 28. An embodiment of the disclosure includes the storage device according to statement 27, wherein the property of the write request is at least one of a range of LBAs, a command identifier, a namespace identifier, a stream identifier, a zone namespace identifier, an identifier of a submission queue, a date, a time, a protocol, a media access control identifier, a network parameter, or a storage device parameter.

Statement 29. An embodiment of the disclosure includes the storage device according to statement 25, wherein the number of extensions is a default number of extensions for the storage device.

Statement 30. An embodiment of the disclosure includes the storage device according to statement 25, wherein the extension tracker is configured to renew the retention period based at least in part on the number of extensions.

Statement 31. An embodiment of the disclosure includes the storage device according to statement 25, wherein the extension tracker is configured to automatically renew the retention period based at least in part on the number of extensions.

Statement 32. An embodiment of the disclosure includes the storage device according to statement 30, wherein the extension tracker is further configured to renew the retention period based at least in part on the number of extensions being greater than zero.

Statement 33. An embodiment of the disclosure includes the storage device according to statement 30, wherein the extension tracker is further configured to automatically renew the retention period based at least in part on the number of extensions being greater than zero.

Statement 34. An embodiment of the disclosure includes the storage device according to statement 32, wherein the extension tracker is configured to decrement the number of extensions.

Statement 35. An embodiment of the disclosure includes the storage device according to statement 30, wherein the extension tracker is further configured to renew the retention period based at least in part on the number of extensions being greater than a number of refresh times.

Statement 36. An embodiment of the disclosure includes the storage device according to statement 30, wherein the extension tracker is further configured to automatically renew the retention period based at least in part on the number of extensions being greater than a number of refresh times.

Statement 37. An embodiment of the disclosure includes the storage device according to statement 35, wherein the extension tracker is configured to increment the number of refresh times.

Statement 38. An embodiment of the disclosure includes the storage device according to statement 35, wherein the logical-to-physical mapping table further maps the logical address to the number of refresh times.

Statement 39. An embodiment of the disclosure includes the storage device according to statement 30, wherein:
the translation layer is configured to select a second physical address for the data in the first storage to store the data based at least in part on the retention period and to update the logical-to-physical mapping table to map the logical address to the second physical address and the retention period; and
the controller is configured to program the data into the second physical address in the first storage.

Statement 40. An embodiment of the disclosure includes the storage device according to statement 39, wherein the controller is further configured to invalidate the data at the physical address in the first storage.

Statement 41. An embodiment of the disclosure includes the storage device according to statement 25, wherein the logical-to-physical mapping table further maps the logical address to the number of extensions.

Statement 42. An embodiment of the disclosure includes the storage device according to statement 24, wherein the extension tracker is configured to invalidate the data at the physical address in the first storage based at least in part on expiration of the retention period.

Statement 43. An embodiment of the disclosure includes the storage device according to statement 24, wherein the extension tracker is configured to automatically invalidate the data at the physical address in the first storage based at least in part on expiration of the retention period.

Statement 44. An embodiment of the disclosure includes the storage device according to statement 42, wherein the extension tracker is further configured to invalidate the data at the physical address in the first storage based at least in part on a number of extensions being zero.

Statement 45. An embodiment of the disclosure includes the storage device according to statement 42, wherein the extension tracker is further configured to automatically invalidate the data at the physical address in the first storage based at least in part on a number of extensions being zero.

Statement 46. An embodiment of the disclosure includes the storage device according to statement 42, wherein the extension tracker is further configured to invalidate the data at the physical address in the first storage based at least in part on a number of extensions equaling a number of refresh times.

Statement 47. An embodiment of the disclosure includes the storage device according to statement 42, wherein the extension tracker is further configured to automatically invalidate the data at the physical address in the first storage based at least in part on a number of extensions equaling a number of refresh times.

Statement 48. An embodiment of the disclosure includes the storage device according to statement 46, wherein the logical-to-physical mapping table further maps the logical address to the number of extensions and the number of refresh times.

Statement 49. An embodiment of the disclosure includes the storage device according to statement 42, wherein the translation layer includes a logger to record the logical address in a data retention period log based at least in part on invalidation of the data.

Statement 50. An embodiment of the disclosure includes the storage device according to statement 49, wherein the translation layer is configured to receive a request from the host for the data retention period log and to return the data retention period log to the host.

Statement 51. An embodiment of the disclosure includes the storage device according to statement 1, wherein the translation layer includes a garbage collection controller to schedule garbage collection based at least in part on the retention period.

Statement 52. An embodiment of the disclosure includes the storage device according to statement 1, wherein the translation layer is configured to receive from the host a configuration command.

Statement 53. An embodiment of the disclosure includes the storage device according to statement 52, wherein the configuration command includes at least one of an enable retention command, a disable retention command, a set of available retention periods, a default retention period, or a default number of extensions.

Statement 54. An embodiment of the disclosure includes the storage device according to statement 1, wherein the translation layer includes at least a first submission queue associated with the retention period and a second submission queue associated with a second retention period.

Statement 55. An embodiment of the disclosure includes the storage device according to statement 1, wherein:
  the host interface is configured to receive a read request from the host, the read request including the logical address;
  the logical-to-physical mapping table further maps the logical address to a first ECC mode;
  the translation layer is configured to use the logical-to-physical mapping table to determine the physical address and the first ECC mode based at least in part on the logical address and to return the data to the host; and
  the controller is configured to read an encoded data from the physical address in the first storage and to decode the encoded data based at least in part on the first ECC mode to produce the data.

Statement 56. An embodiment of the disclosure includes a method, comprising:
  receiving a write request from a host at a storage device, the write request including a data and a logical address of the data;
  determining a retention period for the data;
  selecting a physical address in the storage device to store the data based at least in part on the retention period;
  updating a logical-to-physical mapping table in the storage device to store the logical address, the physical address, and the retention period; and
  programming the data into the physical address in the storage device.

Statement 57. An embodiment of the disclosure includes the method according to statement 56, further comprising returning a result of the write request from the storage device to the host.

Statement 58. An embodiment of the disclosure includes the method according to statement 56, wherein:
  receiving the write request from the host at the storage device includes receiving the write request from the host at a Solid State Drive (SSD);
  selecting the physical address in the storage device to store the data based at least in part on the retention period includes selecting the physical address in a block in the SSD to store the data based at least in part on the retention period;
  updating the logical-to-physical mapping table in the storage device to store the logical address, the physical address, and the retention period includes updating the logical-to-physical mapping table in the SSD to store the logical address, the physical address, and the retention period; and
  programming the data into the physical address in the storage device includes programming the data into the physical address in the block in the SSD.

Statement 59. An embodiment of the disclosure includes the method according to statement 58, wherein:
  selecting the physical address in the block in the SSD to store the data based at least in part on the retention period includes selecting the physical address in the block in a flash translation layer (FTL) in the SSD to store the data based at least in part on the retention period; and
  updating the logical-to-physical mapping table in the SSD to store the logical address, the physical address, and the retention period includes updating the logical-to-physical mapping table in the FTL in the SSD to store the logical address, the physical address, and the retention period.

Statement 60. An embodiment of the disclosure includes the method according to statement 58, wherein programming the data into the physical address in the SSD includes:
  sending a programming request to a controller, the second write request including the data and the physical address; and
  programming the data into the physical address in the block in the SSD by the controller.

Statement 61. An embodiment of the disclosure includes the method according to statement 58, wherein programming the data into the physical address in the block in the SSD includes:
  buffering the data with a second data, the second data associated with the retention period; and
  programming the data into the physical address in the block in the SSD; and
  programming the second data into a second physical address in the block in the SSD.

Statement 62. An embodiment of the disclosure includes the method according to statement 58, wherein the block includes a second data, the second data associated with the retention period.

Statement 63. An embodiment of the disclosure includes the method according to statement 56, wherein:
  the write request further includes the retention period; and
  determining the retention period includes accessing the retention period from the write request.

Statement 64. An embodiment of the disclosure includes the method according to statement 56, wherein determining the retention period includes determining the retention period based at least in part on a property of the write request.

Statement 65. An embodiment of the disclosure includes a method to statement 64, wherein the property of the write request is at least one of a range of logical block addresses (LBAs), a command identifier, a namespace identifier, a stream identifier, a zone namespace identifier, an identifier of a submission queue, a date, a time, a protocol, a media access control identifier, a network parameter, or a storage device parameter.

Statement 66. An embodiment of the disclosure includes the method according to statement 56 wherein determining the retention period includes accessing a default retention period for the storage device.

Statement 67. An embodiment of the disclosure includes the method according to statement 56, wherein the retention period is one of at least a first data retention period and a second data retention period.

Statement 68. An embodiment of the disclosure includes the method according to statement 56, wherein:
the method further comprises selecting a first error correction code (ECC) mode from at least the first ECC mode and a second ECC mode based at least in part on the retention period;
updating the logical-to-physical mapping table in the storage device to store the logical address, the physical address, and the retention period includes updating the logical-to-physical mapping table in the storage device to further store the first ECC mode; and
programming the data into the physical address in the storage device includes programming the data into the physical address in the storage device based at least in part on the first ECC mode.

Statement 69. An embodiment of the disclosure includes the method according to statement 68, wherein programming the data into the physical address in the storage device based at least in part on the first ECC mode includes:
encoding the data based at least in part on the first ECC mode to produce an encoded data; and
programming the encoded data into the physical address in the storage device.

Statement 70. An embodiment of the disclosure includes the method according to statement 68, wherein selecting the first ECC mode from at least the first ECC mode and the second ECC mode based at least in part on the retention period includes reading the first ECC mode from a table stored in the storage device based at least in part on the retention period.

Statement 71. An embodiment of the disclosure includes the method according to statement 68, wherein:
the method further comprises selecting a first programming step voltage from at least the first programming step voltage and a second programming step voltage based at least in part on the retention period;
updating the logical-to-physical mapping table in the storage device to store the logical address, the physical address, and the retention period further includes updating the logical-to-physical mapping table in the storage device to further store the first programming step voltage; and
programming the data into the physical address in the storage device includes programming the data into the physical address in the storage device based at least in part on the first ECC mode and the first programming step voltage.

Statement 72. An embodiment of the disclosure includes the method according to statement 71, wherein programming the data into the physical address in the storage device based at least in part on the first ECC mode and the first programming step voltage includes:
encoding the data based at least in part on the first ECC mode to produce an encoded data; and
programming the encoded data into the physical address in the storage device based at least in part on the first programming step voltage.

Statement 73. An embodiment of the disclosure includes the method according to statement 71, wherein selecting the first programming step voltage from at least the first programming step voltage and the second programming step voltage based at least in part on the retention period includes reading the first programming step voltage from a table stored in the storage device based at least in part on the retention period.

Statement 74. An embodiment of the disclosure includes the method according to statement 56, wherein:
the method further comprises selecting a first programming step voltage from at least the first programming step voltage and a second programming step voltage based at least in part on the retention period;
updating the logical-to-physical mapping table in the storage device to store the logical address, the physical address, and the retention period includes updating the logical-to-physical mapping table in the storage device to further store the first programming step voltage; and
programming the data into the physical address in the storage device includes programming the data into the physical address in the storage device based at least in part on the first programming step voltage.

Statement 75. An embodiment of the disclosure includes the method according to statement 74, wherein selecting the first programming step voltage from at least the first programming step voltage and the second programming step voltage based at least in part on the retention period includes reading the first programming step voltage from a table stored in the storage device based at least in part on the retention period.

Statement 76. An embodiment of the disclosure includes the method according to statement 56, wherein:
the method further comprises determining a number of extensions for the data retention period; and
updating the logical-to-physical mapping table in the storage device to store the logical address, the physical address, and the retention period includes updating the logical-to-physical mapping table in the storage device to further store the number of extensions.

Statement 77. An embodiment of the disclosure includes the method according to statement 76, wherein:
the write request further includes the number of extensions; and
determining the number of extensions includes accessing the number of extensions from the write request.

Statement 78. An embodiment of the disclosure includes the method according to statement 76, wherein determining the number of extensions includes determining the number of extensions based at least in part on a property of the write request.

Statement 79. An embodiment of the disclosure includes a method to statement 78, wherein the property of the write request is at least one of a range of LB As, a command identifier, a namespace identifier, a stream identifier, a zone namespace identifier, an identifier of a submission queue, a date, a time, a protocol, a media access control identifier, a network parameter, or a storage device parameter.

Statement 80. An embodiment of the disclosure includes the method according to statement 76 wherein determining the number of extensions includes accessing a default number of extensions for the storage device.

Statement 81. An embodiment of the disclosure includes the method according to statement 76, wherein updating the logical-to-physical mapping table in the storage device to store the logical address, the physical address, and the retention period further includes updating the logical-to-physical mapping table in the storage device to further store a number of refresh times.

Statement 82. An embodiment of the disclosure includes the method according to statement 76, further comprising:
  determining that the retention period has expired; and
  renewing the retention period based at least in part on the number of extensions.

Statement 83. An embodiment of the disclosure includes the method according to statement 76, wherein renewing the retention period based at least in part on the number of extensions includes automatically renewing the retention period based at least in part on the number of extensions.

Statement 84. An embodiment of the disclosure includes the method according to statement 82, wherein:
  the method further comprises scheduling a check that the retention period has expired at a scheduled time; and
  determining that the retention period has expired includes determining that the retention period has expired based at least in part on the scheduled time arriving.

Statement 85. An embodiment of the disclosure includes the method according to statement 82, further comprising decrementing the number of extensions.

Statement 86. An embodiment of the disclosure includes the method according to statement 82, further comprising increasing a number of refresh times.

Statement 87. An embodiment of the disclosure includes the method according to statement 82, wherein renewing the retention period based at least in part on the number of extensions includes:
  selecting a second physical address in the storage device to store the data based at least in part on the retention period; and
  programming the data into the second physical address in the storage device.

Statement 88. An embodiment of the disclosure includes the method according to statement 87, wherein programming the data into the second physical address in the storage device includes reading the data from the physical address in the storage device.

Statement 89. An embodiment of the disclosure includes the method according to statement 87, wherein renewing the retention period based at least in part on the number of extensions further includes updating the logical-to-physical mapping table in the storage device to store the logical address, the second physical address, and the retention period.

Statement 90. An embodiment of the disclosure includes the method according to statement 56, further comprising scheduling garbage collection for the storage device based at least in part on the retention period.

Statement 91. An embodiment of the disclosure includes the method according to statement 56, further comprising:
  determining that the retention period has expired; and
  invalidating the data at the physical address on the storage device based at least in part on the number of extensions.

Statement 92. An embodiment of the disclosure includes the method according to statement 56, wherein invalidating the data at the physical address on the storage device based at least in part on the number of extensions includes automatically invalidating the data at the physical address on the storage device based at least in part on the number of extensions.

Statement 93. An embodiment of the disclosure includes the method according to statement 91, further comprising recording the logical address in a data retention period log based at least in part on invalidation of the data.

Statement 94. An embodiment of the disclosure includes the method according to statement 93, further comprising:
  receiving a request from the host at the storage device for the data retention period log; and
  returning the data retention period log from the storage device to the host.

Statement 95. An embodiment of the disclosure includes the method according to statement 56, further comprising receiving from the host a configuration command.

Statement 96. An embodiment of the disclosure includes the method according to statement 95, wherein the configuration command includes at least one of an enable retention command, a disable retention command, a set of available retention periods, a default retention period, or a default number of extensions.

Statement 97. An embodiment of the disclosure includes the method according to statement 56, further comprising placing the write request in a first submission queue based at least in part on the retention period, the storage device including the first submission queue and a second submission queue.

Statement 98. An embodiment of the disclosure includes a method, comprising:
  receiving a read request from a host at a storage device, the read request including a logical address of a data;
  determining a physical address for the data based at least in part on the logical address;
  determining an error correction code (ECC) mode for the data based at least in part on the logical address;
  reading an encoded data from the physical address in the storage device;
  decoding the encoded data based at least in part on the ECC mode to produce the data; and
  returning the data from the storage device to the host.

Statement 99. An embodiment of the disclosure includes the method according to statement 98, wherein:
  receiving the read request from the host at the storage device includes receiving the read request from the host at a Solid State Drive (SSD); and
  returning the data from the storage device to the host includes returning the data from the SSD to the host.

Statement 100. An embodiment of the disclosure includes the method according to statement 98, wherein:
  determining the physical address for the data based at least in part on the logical address includes determining the physical address for the data in a logical-to-physical mapping table based at least in part on the logical address; and
  determining the ECC mode for the data based at least in part on the logical address includes determining the ECC mode for the data in the logical-to-physical mapping table based at least in part on the logical address.

Statement 101. An embodiment of the disclosure includes the method according to statement 98, wherein:
  reading an encoded data from the physical address in the storage device includes:
    sending a second read request to a controller, the second read request including the physical address; and
    reading the encoded data from the physical address in the storage device by the controller;
  decoding the encoded data based at least in part on the ECC mode to produce the data includes decoding the encoded data by the controller based at least in part on the ECC mode to produce the data; and returning the data from the storage device to the host includes returning the data from the controller.

Statement 102. An embodiment of the disclosure includes an article, comprising a non-transitory storage medium, the non-transitory storage medium having stored thereon instructions that, when executed by a machine, result in:

receiving a write request from a host at a storage device, the write request including a data and a logical address of the data;

determining a retention period for the data;

selecting a physical address in the storage device to store the data based at least in part on the retention period;

updating a logical-to-physical mapping table in the storage device to store the logical address, the physical address, and the retention period; and programming the data into the physical address in the storage device.

Statement 103. An embodiment of the disclosure includes the article according to statement 102, the non-transitory storage medium having stored thereon further instructions that, when executed by the machine, result in returning a result of the write request from the storage device to the host.

Statement 104. An embodiment of the disclosure includes the article according to statement 102, wherein:

receiving the write request from the host at the storage device includes receiving the write request from the host at a Solid State Drive (SSD);

selecting the physical address in the storage device to store the data based at least in part on the retention period includes selecting the physical address in a block in the SSD to store the data based at least in part on the retention period;

updating the logical-to-physical mapping table in the storage device to store the logical address, the physical address, and the retention period includes updating the logical-to-physical mapping table in the SSD to store the logical address, the physical address, and the retention period; and programming the data into the physical address in the storage device includes programming the data into the physical address in the block in the SSD.

Statement 105. An embodiment of the disclosure includes the article according to statement 104, wherein:

selecting the physical address in the block in the SSD to store the data based at least in part on the retention period includes selecting the physical address in the block in a flash translation layer (FTL) in the SSD to store the data based at least in part on the retention period; and updating the logical-to-physical mapping table in the SSD to store the logical address, the physical address, and the retention period includes updating the logical-to-physical mapping table in the FTL in the SSD to store the logical address, the physical address, and the retention period.

Statement 106. An embodiment of the disclosure includes the article according to statement 104, wherein programming the data into the physical address in the SSD includes:

sending a programming request to a controller, the second write request including the data and the physical address; and programming the data into the physical address in the block in the SSD by the controller.

Statement 107. An embodiment of the disclosure includes the article according to statement 104, wherein programming the data into the physical address in the block in the SSD includes:

buffering the data with a second data, the second data associated with the retention period; and programming the data into the physical address in the block in the SSD; and programming the second data into a second physical address in the block in the SSD.

Statement 108. An embodiment of the disclosure includes the article according to statement 104, wherein the block includes a second data, the second data associated with the retention period.

Statement 109. An embodiment of the disclosure includes the article according to statement 102, wherein:

the write request further includes the retention period; and determining the retention period includes accessing the retention period from the write request.

Statement 110. An embodiment of the disclosure includes the article according to statement 102, wherein determining the retention period includes determining the retention period based at least in part on a property of the write request.

Statement 111. An embodiment of the disclosure includes an article to statement 110, wherein the property of the write request is at least one of a range of logical block addresses (LBAs), a command identifier, a namespace identifier, a stream identifier, a zone namespace identifier, an identifier of a submission queue, a date, a time, a protocol, a media access control identifier, a network parameter, or a storage device parameter.

Statement 112. An embodiment of the disclosure includes the article according to statement 102 wherein determining the retention period includes accessing a default retention period for the storage device.

Statement 113. An embodiment of the disclosure includes the article according to statement 102, wherein the retention period is one of at least a first data retention period and a second data retention period.

Statement 114. An embodiment of the disclosure includes the article according to statement 102, wherein:

the non-transitory storage medium has stored thereon further instructions that, when executed by the machine, result in selecting a first error correction code (ECC) mode from at least the first ECC mode and a second ECC mode based at least in part on the retention period;

updating the logical-to-physical mapping table in the storage device to store the logical address, the physical address, and the retention period includes updating the logical-to-physical mapping table in the storage device to further store the first ECC mode; and programming the data into the physical address in the storage device includes programming the data into the physical address in the storage device based at least in part on the first ECC mode.

Statement 115. An embodiment of the disclosure includes the article according to statement 114, wherein programming the data into the physical address in the storage device based at least in part on the first ECC mode includes:

encoding the data based at least in part on the first ECC mode to produce an encoded data; and programming the encoded data into the physical address in the storage device.

Statement 116. An embodiment of the disclosure includes the article according to statement 114, wherein selecting the first ECC mode from at least the first ECC mode and the second ECC mode based at least in part on the retention period includes reading the first ECC mode from a table stored in the storage device based at least in part on the retention period.

Statement 117. An embodiment of the disclosure includes the article according to statement 114, wherein:
the non-transitory storage medium has stored thereon further instructions that, when executed by the machine, result in selecting a first programming step voltage from at least the first programming step voltage and a second programming step voltage based at least in part on the retention period;
updating the logical-to-physical mapping table in the storage device to store the logical address, the physical address, and the retention period further includes updating the logical-to-physical mapping table in the storage device to further store the first programming step voltage; and
programming the data into the physical address in the storage device includes programming the data into the physical address in the storage device based at least in part on the first ECC mode and the first programming step voltage.

Statement 118. An embodiment of the disclosure includes the article according to statement 117, wherein programming the data into the physical address in the storage device based at least in part on the first ECC mode and the first programming step voltage includes:
encoding the data based at least in part on the first ECC mode to produce an encoded data; and
programming the encoded data into the physical address in the storage device based at least in part on the first programming step voltage.

Statement 119. An embodiment of the disclosure includes the article according to statement 117, wherein selecting the first programming step voltage from at least the first programming step voltage and the second programming step voltage based at least in part on the retention period includes reading the first programming step voltage from a table stored in the storage device based at least in part on the retention period.

Statement 120. An embodiment of the disclosure includes the article according to statement 102, wherein:
the non-transitory storage medium has stored thereon further instructions that, when executed by the machine, result in selecting a first programming step voltage from at least the first programming step voltage and a second programming step voltage based at least in part on the retention period;
updating the logical-to-physical mapping table in the storage device to store the logical address, the physical address, and the retention period includes updating the logical-to-physical mapping table in the storage device to further store the first programming step voltage; and
programming the data into the physical address in the storage device includes programming the data into the physical address in the storage device based at least in part on the first programming step voltage.

Statement 121. An embodiment of the disclosure includes the article according to statement 120, wherein selecting the first programming step voltage from at least the first programming step voltage and the second programming step voltage based at least in part on the retention period includes reading the first programming step voltage from a table stored in the storage device based at least in part on the retention period.

Statement 122. An embodiment of the disclosure includes the article according to statement 102, wherein:
the non-transitory storage medium has stored thereon further instructions that, when executed by the machine, result in determining a number of extensions for the data retention period; and
updating the logical-to-physical mapping table in the storage device to store the logical address, the physical address, and the retention period includes updating the logical-to-physical mapping table in the storage device to further store the number of extensions.

Statement 123. An embodiment of the disclosure includes the article according to statement 122, wherein:
the write request further includes the number of extensions; and
determining the number of extensions includes accessing the number of extensions from the write request.

Statement 124. An embodiment of the disclosure includes the article according to statement 122, wherein determining the number of extensions includes determining the number of extensions based at least in part on a property of the write request.

Statement 125. An embodiment of the disclosure includes an article to statement 124, wherein the property of the write request is at least one of a range of LB As, a command identifier, a namespace identifier, a stream identifier, a zone namespace identifier, an identifier of a submission queue, a date, a time, a protocol, a media access control identifier, a network parameter, or a storage device parameter.

Statement 126. An embodiment of the disclosure includes the article according to statement 122 wherein determining the number of extensions includes accessing a default number of extensions for the storage device.

Statement 127. An embodiment of the disclosure includes the article according to statement 122, wherein updating the logical-to-physical mapping table in the storage device to store the logical address, the physical address, and the retention period further includes updating the logical-to-physical mapping table in the storage device to further store a number of refresh times.

Statement 128. An embodiment of the disclosure includes the article according to statement 122, the non-transitory storage medium having stored thereon further instructions that, when executed by the machine, result in:
determining that the retention period has expired; and
renewing the retention period based at least in part on the number of extensions.

Statement 129. An embodiment of the disclosure includes the article according to statement 122, wherein renewing the retention period based at least in part on the number of extensions includes automatically renewing the retention period based at least in part on the number of extensions.

Statement 130. An embodiment of the disclosure includes the article according to statement 128, wherein:
the non-transitory storage medium has stored thereon further instructions that, when executed by the machine, result in scheduling a check that the retention period has expired at a scheduled time; and
determining that the retention period has expired includes determining that the retention period has expired based at least in part on the scheduled time arriving.

Statement 131. An embodiment of the disclosure includes the article according to statement 128, the non-transitory storage medium having stored thereon further instructions that, when executed by the machine, result in decrementing the number of extensions.

Statement 132. An embodiment of the disclosure includes the article according to statement 128, the non-transitory storage medium having stored thereon further instructions that, when executed by the machine, result in increasing a number of refresh times.

Statement 133. An embodiment of the disclosure includes the article according to statement 128, wherein renewing the retention period based at least in part on the number of extensions includes:
  selecting a second physical address in the storage device to store the data based at least in part on the retention period; and
  programming the data into the second physical address in the storage device.

Statement 134. An embodiment of the disclosure includes the article according to statement 133, wherein programming the data into the second physical address in the storage device includes reading the data from the physical address in the storage device.

Statement 135. An embodiment of the disclosure includes the article according to statement 133, wherein renewing the retention period based at least in part on the number of extensions further includes updating the logical-to-physical mapping table in the storage device to store the logical address, the second physical address, and the retention period.

Statement 136. An embodiment of the disclosure includes the article according to statement 102, the non-transitory storage medium having stored thereon further instructions that, when executed by the machine, result in scheduling garbage collection for the storage device based at least in part on the retention period.

Statement 137. An embodiment of the disclosure includes the article according to statement 102, the non-transitory storage medium having stored thereon further instructions that, when executed by the machine, result in:
  determining that the retention period has expired; and
  invalidating the data at the physical address on the storage device based at least in part on the number of extensions.

Statement 138. An embodiment of the disclosure includes the article according to statement 102, wherein invalidating the data at the physical address on the storage device based at least in part on the number of extensions includes automatically invalidating the data at the physical address on the storage device based at least in part on the number of extensions.

Statement 139. An embodiment of the disclosure includes the article according to statement 137, the non-transitory storage medium having stored thereon further instructions that, when executed by the machine, result in recording the logical address in a data retention period log based at least in part on invalidation of the data.

Statement 140. An embodiment of the disclosure includes the article according to statement 139, the non-transitory storage medium having stored thereon further instructions that, when executed by the machine, result in:
  receiving a request from the host at the storage device for the data retention period log; and
  returning the data retention period log from the storage device to the host.

Statement 141. An embodiment of the disclosure includes the article according to statement 102, the non-transitory storage medium having stored thereon further instructions that, when executed by the machine, result in receiving from the host a configuration command.

Statement 142. An embodiment of the disclosure includes the article according to statement 141, wherein the configuration command includes at least one of an enable retention command, a disable retention command, a set of available retention periods, a default retention period, or a default number of extensions.

Statement 143. An embodiment of the disclosure includes the article according to statement 102, the non-transitory storage medium having stored thereon further instructions that, when executed by the machine, result in placing the write request in a first submission queue based at least in part on the retention period, the storage device including the first submission queue and a second submission queue.

Statement 144. An embodiment of the disclosure includes an article, comprising a non-transitory storage medium, the non-transitory storage medium having stored thereon instructions that, when executed by a machine, result in:
  receiving a read request from a host at a storage device, the read request including a logical address of a data;
  determining a physical address for the data based at least in part on the logical address;
  determining an error correction code (ECC) mode for the data based at least in part on the logical address;
  reading an encoded data from the physical address in the storage device; decoding the encoded data based at least in part on the ECC mode to produce the data; and
  returning the data from the storage device to the host.

Statement 145. An embodiment of the disclosure includes the article according to statement 144, wherein:
  receiving the read request from the host at the storage device includes receiving the read request from the host at a Solid State Drive (SSD); and
  returning the data from the storage device to the host includes returning the data from the SSD to the host.

Statement 146. An embodiment of the disclosure includes the article according to statement 144, wherein:
  determining the physical address for the data based at least in part on the logical address includes determining the physical address for the data in a logical-to-physical mapping table based at least in part on the logical address; and
  determining the ECC mode for the data based at least in part on the logical address includes determining the ECC mode for the data in the logical-to-physical mapping table based at least in part on the logical address.

Statement 147. An embodiment of the disclosure includes the article according to statement 144, wherein:
  reading an encoded data from the physical address in the storage device includes:
    sending a second read request to a controller, the second read request including the physical address; and
    reading the encoded data from the physical address in the storage device by the controller;
  decoding the encoded data based at least in part on the ECC mode to produce the data includes decoding the encoded data by the controller based at least in part on the ECC mode to produce the data; and
  returning the data from the storage device to the host includes returning the data from the controller.

Consequently, in view of the wide variety of permutations to the embodiments described herein, this detailed description and accompanying material is intended to be illustrative only, and should not be taken as limiting the scope of the disclosure. What is claimed as the disclosure, therefore, is all such modifications as may come within the scope and spirit of the following claims and equivalents thereto.

What is claimed is:

1. A storage device, comprising:
    a host interface to receive a write request from a host, the write request including a data and a logical address of the data;
    a first storage for the data;
    a retention period determiner to identify a data set associated with the data and a second data, and to determine a retention period and a number of extensions for the data set;
    a translation layer to select a physical address in the first storage to store the data based at least in part on the retention period;
    a second storage for a logical-to-physical mapping table to store the logical address associated with the physical address, the retention period, and the number of extensions; and
    a controller to program the data into the physical address in the first storage.

2. The storage device according to claim 1, wherein the translation layer includes an error correction code (ECC) selector to select a first ECC mode from at least the first ECC mode and a second ECC mode based at least in part on the retention period.

3. The storage device according to claim 2, wherein the logical-to-physical mapping table further maps the logical address to the first ECC mode.

4. The storage device according to claim 1, wherein:
    the first storage includes a Not-AND (NAND) flash storage;
    the translation layer includes a programming step voltage selector to select a first programming step voltage from at least the first programming step voltage and a second programming step voltage based at least in part on the retention period; and
    the logical-to-physical mapping table further stores the logical address associated with the first programming step voltage.

5. The storage device according to claim 1, wherein the translation layer includes an extension tracker to track the expiration of the retention period.

6. The storage device according to claim 5, wherein the extension tracker is configured to automatically renew the retention period based at least in part on the number of extensions.

7. The storage device according to claim 5, wherein the extension tracker is configured to invalidate the data at the physical address in the first storage based at least in part on expiration of the retention period and the number of extensions.

8. The storage device according to claim 1, wherein the data set is associated with a range of logical block addresses (LBAs), a namespace identifier, a zone namespace identifier, or a submission queue identifier.

9. The storage device according to claim 1, wherein the data set is associated with a default retention period, a host identifier, a command identifier, a media access control identifier, or a protocol type.

10. The storage device according to claim 1, wherein the data set is associated with a date, a clock time, a stream identifier, a storage parameter, or a network parameter.

11. The storage device according to claim 1, wherein the retention period for the data set is applied to the data and to the second data.

12. An article, comprising a non-transitory storage medium, the non-transitory storage medium having stored thereon instructions that, when executed by a machine, result in:
    receiving a write request from a host at a storage device, the write request including a data and a logical address of the data;
    identifying a data set including the data and a second data; and
    determining a retention period and a number of extensions for the data set;
    selecting a physical address in the storage device to store the data based at least in part on the retention period;
    updating a logical-to-physical mapping table in the storage device to store the logical address, the physical address, the retention period, and the number of extensions; and
    programming the data into the physical address in the storage device.

13. The article according to claim 12, wherein:
    the non-transitory storage medium has stored thereon further instructions that, when executed by the machine, result in selecting a first error correction code (ECC) mode from at least the first ECC mode and a second ECC mode based at least in part on the retention period;
    updating the logical-to-physical mapping table in the storage device to store the logical address, the physical address, and the retention period includes updating the logical-to-physical mapping table in the storage device to further store the first ECC mode; and
    programming the data into the physical address in the storage device includes programming the data into the physical address in the storage device based at least in part on the first ECC mode.

14. The article according to claim 12, wherein:
    the non-transitory storage medium has stored thereon further instructions that, when executed by the machine, result in selecting a first programming step voltage from at least the first programming step voltage and a second programming step voltage based at least in part on the retention period;
    updating the logical-to-physical mapping table in the storage device to store the logical address, the physical address, and the retention period includes updating the logical-to-physical mapping table in the storage device to further store the first programming step voltage; and
    programming the data into the physical address in the storage device includes programming the data into the physical address in the storage device based at least in part on the first programming step voltage.

15. The article according to claim 12, the non-transitory storage medium having stored thereon further instructions that, when executed by the machine, result in:
    determining that the retention period has expired; and
    automatically renewing the retention period based at least in part on the number of extensions.

16. The article according to claim 12, the non-transitory storage medium having stored thereon further instructions that, when executed by the machine, result in:
    determining that the retention period has expired; and
    invalidating the data at the physical address on the storage device based at least in part on the number of extensions.

* * * * *